(12) United States Patent
Kim et al.

(10) Patent No.: US 9,350,193 B2
(45) Date of Patent: May 24, 2016

(54) METHOD AND APPARATUS FOR DETECTING LOAD FLUCTUATION OF WIRELESS POWER TRANSMISSION

(75) Inventors: Nam Yun Kim, Seoul (KR); Sang Wook Kwon, Seongnam-si (KR); Yun Kwon Park, Dongducheon-si (KR); Eun Seok Park, Yongin-si (KR); Young Tack Hong, Seongnam-si (KR); Ki Young Kim, Yongin-si (KR); Young Ho Ryu, Yongin-si (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 13/484,422

(22) Filed: May 31, 2012

(65) Prior Publication Data

US 2012/0306269 A1 Dec. 6, 2012

Related U.S. Application Data

(60) Provisional application No. 61/491,953, filed on Jun. 1, 2011.

(30) Foreign Application Priority Data

Aug. 5, 2011 (KR) .................. 10-2011-0078080

(51) Int. Cl.
*H02J 1/00* (2006.01)
*H02J 7/02* (2016.01)
*B60L 11/18* (2006.01)

(52) U.S. Cl.
CPC ............. *H02J 7/025* (2013.01); *B60L 11/182* (2013.01); *B60L 11/1833* (2013.01); *B60L 2210/10* (2013.01); *B60L 2210/30* (2013.01); *B60L 2210/40* (2013.01); *Y02T 10/7005* (2013.01);
(Continued)

(58) Field of Classification Search
CPC .................................. H02J 1/00; H02J 5/0037
USPC ...................................................... 307/11, 104
See application file for complete search history.

(56) References Cited

U.S. PATENT DOCUMENTS

2007/0271006 A1* 11/2007 Golden ............... H02J 3/14
700/295
2008/0169706 A1* 7/2008 Onishi ................ H02J 7/025
307/104

(Continued)

FOREIGN PATENT DOCUMENTS

EP 2211579 A1 * 7/2010 ........... H04R 25/552
JP 2008-278592 A 11/2008
(Continued)

*Primary Examiner* — Thienvu Tran
*Assistant Examiner* — Joseph Inge
(74) *Attorney, Agent, or Firm* — NSIP Law

(57) ABSTRACT

A method and apparatus to detect load fluctuation of a wireless power transmission are provided. A wireless power transmitter includes a resonator configured to wirelessly transmit, to a target device, an output power. The wireless power transmitter further includes a power detector configured to detect a current of the output power. The wireless power transmitter further includes a controller configured to detect a change in the current, and to detect a target load based on the change in the current. The target load includes a load of which the output power is applied thereto.

18 Claims, 22 Drawing Sheets

(52) U.S. Cl.
CPC .......... *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y10T 307/25* (2015.04)

(56) References Cited

U.S. PATENT DOCUMENTS

| | | | | |
|---|---|---|---|---|
| 2009/0088080 | A1* | 4/2009 | Zhang | H04W 72/0486 455/63.1 |
| 2009/0127937 | A1* | 5/2009 | Widmer | H02J 5/005 307/149 |
| 2012/0146425 | A1* | 6/2012 | Lee | H02J 5/005 307/104 |
| 2013/0106198 | A1* | 5/2013 | Kuk | H01F 38/14 307/104 |

FOREIGN PATENT DOCUMENTS

| | | |
|---|---|---|
| KR | 10-2007-0030217 A | 3/2007 |
| KR | 10-2010-0012944 A | 2/2010 |
| KR | 10-2011-0009228 A | 1/2011 |

\* cited by examiner

METHOD AND APPARATUS FOR DETECTING LOAD FLUCTUATION OF WIRELESS POWER TRANSMISSION

CROSS-REFERENCE TO RELATED APPLICATION(S)

This application claims the benefit under 35 U.S.C. §119 (e) of U.S. Provisional Application No. 61/491,953, filed on Jun. 1, 2011, in the United States Patent and Trademark Office, and claims the benefit under 35 U.S.C. §119(a) of Korean Patent Application No. 10-2011-0078080, filed on Aug. 5, 2011, in the Korean Intellectual Property Office, the entire disclosures of which are incorporated herein by reference for all purposes.

BACKGROUND

1. Field

The following description relates to a method and apparatus to wirelessly transmit power, and more particularly, to a method and apparatus to detect load fluctuation in a wireless power transmission.

2. Description of Related Art

A wireless power refers to energy that is transferred from a wireless power transmitter to a wireless power receiver through magnetic coupling. Accordingly, a wireless power transmission and charging system includes a source device and a target device. The source device may wirelessly transmit a power, and the target device may wirelessly receive a power. Here, the source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator.

A single source device may transmit power to a plurality of target devices. In an example in which a plurality of target devices simultaneously approach a resonator of a source device, or the plurality of target devices are located within a range of the resonator, and power is supplied to the source device, data collision may occur during an operation for initial connection due to the plurality of target devices requesting connection. Accordingly, a normal charging operation may not be performed.

SUMMARY

In one general aspect, there is provided a wireless power transmitter including a resonator configured to wirelessly transmit, to a target device, an output power. The wireless power transmitter further includes a power detector configured to detect a current of the output power. The wireless power transmitter further includes a controller configured to detect a change in the current, and to detect a target load based on the change in the current. The target load includes a load of which the output power is applied thereto.

The controller is further configured to determine the output power.

The wireless power transmitter further includes a power converter configured to output the output power.

The load is applied to an output of the power converter.

The wireless power transmitter further includes a power supply configured to apply, to the power converter, a voltage based on a control of the controller.

The controller is further configured to determine a state of a wireless power transmission based on the target load.

When the current is less than a predetermined value, the controller is further configured to terminate a charging of the target device.

The controller is further configured to adjust the output power based on the target load.

The target load includes a sum of loads of target devices.

The current is changed based on a change in a charging mode of the target device from a constant current (CC) mode to a constant voltage (CV) mode.

The power detector includes a first resistor in which the current flows, and a comparator configured to output, to the controller, voltages applied to a first terminal and a second terminal of the first resistor. The controller is further configured to detect the target load based on the voltages and a resistance value of the first resistor.

The wireless power transmitter further includes a power converter configured to output the output power. The power detector further includes a second resistor including a first terminal and a second terminal, the first terminal being connected to the first terminal of the first resistor, and the second terminal being connected to a positive terminal of the comparator. The power detector further includes a third resistor including a first terminal and a second terminal, the first terminal being connected to the second terminal of the first resistor and an input of the power converter, and the second terminal being connected to a negative terminal of the comparator.

In another general aspect, there is provided a method of detecting a load in a wireless power transmission, including wirelessly transmitting, to a target device, an output power. The method further includes detecting a current of the output power. The method further includes detecting a change in the current. The method further includes detecting a target load based on the change in the current, the target load including the load of which the output power is applied thereto.

The method further includes determining a state of the wireless power transmission based on the target load.

The method further includes, when the current is less than a predetermined value, terminating a charging of the target device.

The method further includes adjusting the output power based on the target load.

The target load further includes a sum of loads of target devices.

The current is changed based on a change in a charging mode of the target device from a constant current (CC) mode to a constant voltage (CV) mode.

The method further includes matching an impedance and a resonant frequency of a source device to an impedance and a resonant frequency of the target device.

A non-transitory computer-readable storage medium storing a program includes instructions to cause a computer to implement the method.

Other features and aspects will be apparent from the following detailed description, the drawings, and the claims.

Figure 1:
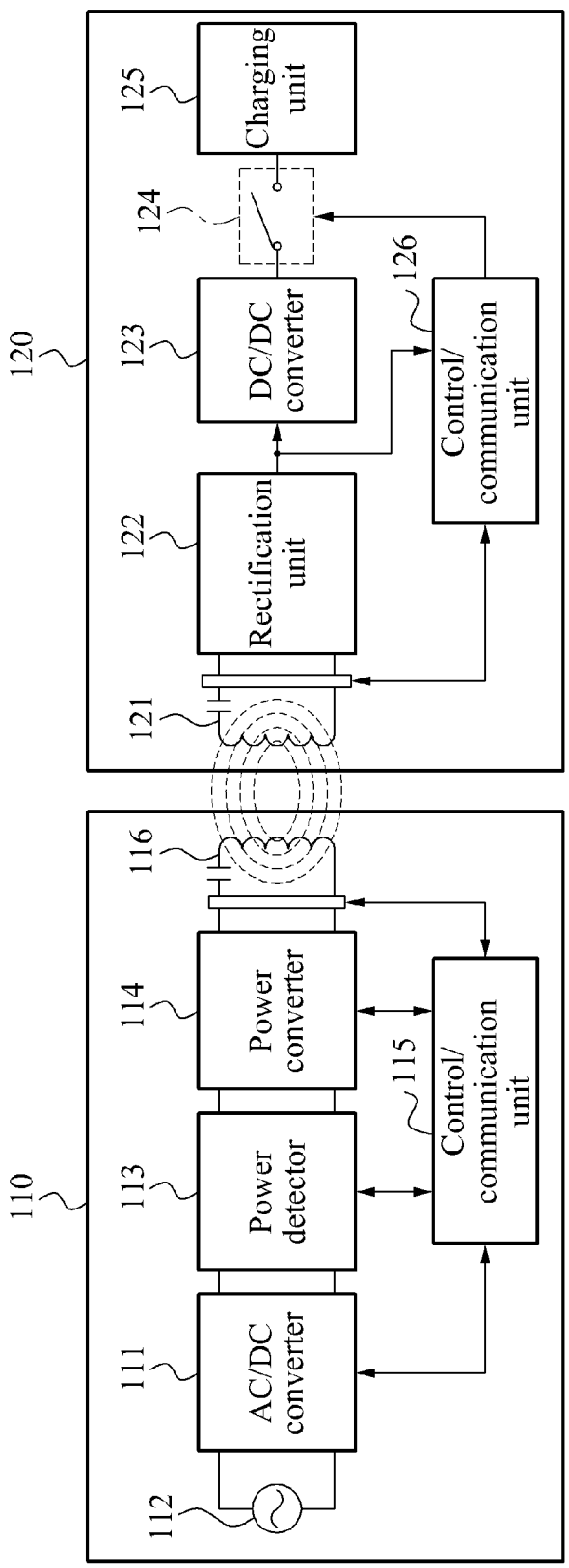
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission and charging system. The wireless power transmission and charging system includes a source device 110 and a target device 120.

The source device 110 includes an alternating current-to-direct current (AC/DC) converter 111, a power detector 113, a power converter 114, a control and communication (control/communication) unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 generates a DC voltage by rectifying an AC voltage in a band of tens of hertz (Hz) output from a power supply 112. The AC/DC converter 111 outputs a DC voltage of a predetermined level, or may adjust an output level of a DC voltage based on the control of the control/communication unit 115.

The power detector 113 detects an output current and an output voltage of the AC/DC converter 111, and transfers, to the control/communication unit 115, information on the detected current and the detected voltage. Additionally, the power detector 113 may detect an input current and an input voltage of the power converter 114.

The power converter 114 generates a power by converting a DC voltage of a predetermined level to an AC voltage, using a switching pulse signal in a band of a few kilohertz (KHz) to tens of megahertz (MHz). For example, the power converter 114 may convert, to an AC voltage, a DC voltage supplied to a power amplifier (PA), using a reference resonant frequency $F_{Ref}$. The power converter 114 may generate a communication power used for communication, or a charging power used to charge. The communication power and/or the charging power may be used in a plurality of target devices, e.g., the target device 120. The communication power may refer to low power of 0.1 milliwatt (mW) to 1 mW, and the charging power may refer to high power of 1 mW to 200 W that is consumed in a device load of a target device.

The term "charging" may refer to supplying power to a unit or element that is configured to charge power. Additionally, the term "charging" may refer to supplying power to a unit or element that is configured to consume power. The units or elements may include, for example, batteries, displays, sound output circuits, main processors, and/or various sensors.

The term "reference resonant frequency" may refer to a resonant frequency that is used by the source device 110. Additionally, the term "tracking frequency" may refer to a resonant frequency that is adjusted by a preset scheme.

The control/communication unit 115 detects a reflected wave of the communication power and/or the charging power, and detects mismatching between the target resonator 121 and the source resonator 116 based on the detected reflected wave. To detect the mismatching, the control/communication unit 115 may detect an envelope of the reflected wave, or detect a power amount of the reflected wave. The control/communication unit 115 computes a voltage standing wave ratio (VSWR) based on a voltage level of the reflected wave, and based on a level of an output voltage of the source resonator 116 or the power converter 114. For example, when the VSWR is less than a predetermined value, the control/communication unit 115 determines that the mismatching is detected. In this example, the control/communication unit 115 computes a power transmission efficiency for each of N tracking frequencies that are set in advance, may determine a tracking frequency $F_{Best}$ with the best power transmission efficiency among the N tracking frequencies, and may adjust the reference resonant frequency $F_{Ref}$ to the tracking frequency $F_{Best}$.

Additionally, the control/communication unit 115 controls a frequency of a switching pulse signal. Under the control of the control/communication unit 115, the frequency of the switching pulse signal is determined. By controlling the power converter 114, the control/communication unit 115 generates a modulation signal to be transmitted to the target device 120. In other words, the control/communication unit 115 may transmit various messages to the target device 120 using in-band communication. Additionally, the control/communication unit 115 may detect a reflected wave of the communication power and/or the charging power, and may demodulate a signal received from the target device 120 through an envelope of the detected reflected wave.

The control/communication unit 115 may generate a modulation signal for in-band communication, using various methods. For example, to generate a modulation signal, the control/communication unit 115 may turn on or off a switching pulse signal, or may perform delta-sigma modulation. In another example, the control/communication unit 115 may generate a pulse-width modulation (PWM) signal with a predetermined envelope.

The control/communication unit 115 may also perform out-band communication that employs a communication channel. The control/communication unit 115 may include a communication module, such as, for example, a ZigBee module, a Bluetooth module, and/or the like. The control/communication unit 115 may transmit or receive data to or from the target device 120 through the out-band communication.

The source resonator 116 transfers an electromagnetic energy to the target resonator 121. For example, the source resonator 116 transfers, to the target device 120, the communication power and/or the charging power, using a magnetic coupling with the target resonator 121.

The target resonator 121 receives the electromagnetic energy from the source resonator 116. For example, the target resonator 121 receives, from the source device 110, the communication power and/or charging power, using the magnetic coupling with the source resonator 116. Additionally, the target resonator 121 may receive various messages from the source device 110 using the in-band communication.

The rectification unit 122 generates a DC voltage by rectifying an AC voltage. The AC voltage is received from the target resonator 121.

The DC/DC converter 123 adjusts a level of the DC voltage output from the rectification unit 122 based on a capacitance of the charging unit 125. For example, the DC/DC converter 123 may adjust the level of the DC voltage output to 3 volt (V) through 10 V.

The switch unit 124 is turned on or off under the control of the control/communication unit 126. When the switch unit 124 is turned off, the control communication unit 115 of the source device 110 detects a reflected wave. In other words, when the switch unit 124 is turned off, the magnetic coupling between the source resonator 116 and the target resonator 121 is eliminated.

The charging unit 125 may include a battery. The charging unit 125 may charge the battery using a DC voltage output from the DC/DC converter 123.

The control/communication unit 126 may perform in-band communication to transmit or receive data using a resonant frequency. During the in-band communication, the control/communication unit 126 may demodulate a received signal by detecting a signal between the target resonator 121 and the rectification unit 122, or by detecting an output signal of the rectification unit 122. In other words, the control/communication unit 126 may demodulate a message received through the in-band communication.

Additionally, the control/communication unit 126 adjusts an impedance of the target resonator 121 to modulate a signal to be transmitted to the source device 110. For example, the control/communication unit 126 may modulate the signal to be transmitted to the source device 110 by turning on or off the switch unit 124. In this example, the control/communication unit 126 may increase the impedance of the target resonator 121 so that a reflected wave may be detected by the control/communication unit 115 of the source device 110. Depending on whether the reflected wave is detected, the control/communication unit 115 may detect a binary number "0" or "1".

The control/communication unit 126 transmits a response message to the source device 110. The response message may include, for example, a type of the corresponding target device 120, "information on a manufacturer of the corresponding target device 120, a model name of the corresponding target device 120, and/or a battery type of the corresponding target device 120. The response message may further include, for example, a scheme of charging the corresponding target device 120, an impedance value of a load of the corresponding target device 120, and/or information on characteristics of the target resonator 121 of the corresponding target device 120. The response message may further include, for example, information on a frequency band used by the corresponding target device 120, an amount of a power consumed by the corresponding target device 120, an identifier (ID) of the corresponding target device 120, and/or information on a version or standard of the corresponding target device.

The control/communication unit 126 may also perform out-band communication that employs a communication channel. The control/communication unit 126 may include a communication module, such as, for example, a ZigBee module, a Bluetooth module, and/or the like. The control/communication unit 126 may transmit or receive data to or from the source device 110 through the out-band communication.

The control/communication unit 126 receives a wake-up request message from the source device 110, detects an amount of a power received by the target resonator 121, and transmits, to the source device 110, information on the detected amount of the power. The information on the detected amount may include, for example, an input voltage value and an input current value of the rectification unit 122, an output voltage value and an output current value of the rectification unit 122, an output voltage value and an output current value of the DC/DC converter 123, and/or the like.

The control/communication unit 115 sets a resonance bandwidth of the source resonator 116. Based on a setting of the resonance bandwidth of the source resonator 116, a Q-factor of the source resonator 116 may be determined.

Additionally, the control/communication unit 126 sets a resonance bandwidth of the target resonator 121. Based on a setting of the resonance bandwidth of the target resonator 121, a Q-factor of the target resonator 121 may be determined.

The resonance bandwidth of the source resonator 116 may be set to be wider or narrower than the resonance bandwidth of the target resonator 121. The source device 110 and the target device 120 communicate with each other to share information on the resonance bandwidth of the source resonator 116 and the resonance bandwidth of the target resonator 121. In an example in which power required by the target device 120 is higher than a reference value, the Q-factor of the source resonator 116 may be set to a value greater than 100. In another example in which the power required by the target device 120 is lower than the reference value, the Q-factor of the source resonator 116 may be set to a value less than 100.

In a wireless power transmission employing a resonance scheme, the resonance bandwidth may be an important factor. In an example in which a Q-factor Qt considers a change in a distance between the source resonator 116 and the target resonator 121, a change in a resonance impedance, impedance mismatching, a reflected signal, and/or the like, Qt may have an inverse-proportional relationship with the resonance bandwidth, as given by Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}.$$

In Equation 1, $f_0$ denotes a central frequency, $\Delta f$ denotes a change in a bandwidth, $\Gamma_{S,D}$ denotes a reflection loss between the source resonator 116 and the target resonator 121, $BW_S$ denotes the resonance bandwidth of the source resonator 116, and $BW_D$ denotes the resonance bandwidth of the target resonator 121.

An efficiency U of the wireless power transmission may be defined, as given in Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad \text{[Equation 2]}$$

In Equation 2, K denotes a coupling coefficient of energy coupling between the source resonator 116 and the target resonator 121, $\Gamma_S$ denotes a reflection coefficient in the source resonator 116, $\Gamma_D$ denotes a reflection coefficient in the target resonator 121, $\omega_0$ denotes a resonant frequency, M denotes a mutual inductance between the source resonator 116 and the target resonator 121, $R_S$ denotes an impedance of the source resonator 116, $R_D$ denotes an impedance of the target resonator 121, $Q_S$ denotes the Q-factor of the source resonator 116, $Q_D$ denotes the Q-factor of the target resonator 121, and $Q_K$ denotes a Q-factor of an energy coupling between the source resonator 116 and the target resonator 121.

Referring to Equation 2, the Q-factors may have high relevance to the efficiency of the wireless power transmission. Accordingly, to increase the efficiency of the wireless power transmission, the Q-factors may be set to higher values. However, when the Q-factors $Q_S$ and $Q_D$ are set to higher values, the efficiency of the wireless power transmission is reduced due to, for example, a change in the coupling coefficient κ, the change in the distance between the source resonator 116 and the target resonator 121, the change in the resonance impedance, impedance mismatching, and/or the like.

Thus, to increase the efficiency of the wireless power transmission, when the resonance bandwidth of the source resonator 116 and the resonance bandwidth of the target resonator 121 are set to be narrower, impedance mismatching and the like occur even due to a small external effect. Considering the impedance mismatching, Equation 1 may be represented as given in Equation 3.

$$\frac{\Delta f}{f_0} = \frac{\sqrt{VSWR} - 1}{Qt\sqrt{VSWR}} \qquad \text{[Equation 3]}$$

In an example in which an unbalanced relationship of a resonance bandwidth, or a bandwidth of an impedance matching frequency between the source resonator 116 and the target resonator 121, is maintained, the efficiency of the wireless power transmission may be prevented from being reduced due to, for example, the change in the coupling coefficient κ, the change in the distance between the source resonator 116 and the target resonator 121, the change in the resonance impedance, the impedance mismatching, and/or the like. When the unbalanced relationship of the resonance bandwidth, or the bandwidth of the impedance matching frequency between the source resonator 116 and the target resonator 121, is maintained, based on Equations 1 and 3, an unbalanced relationship between the Q-factors $Q_S$ and $Q_D$ is also maintained.

Hereinafter, the term "resonator" in FIGS. 2A through 4B may include, for example, a source resonator and a target resonator.

Figure 2A:
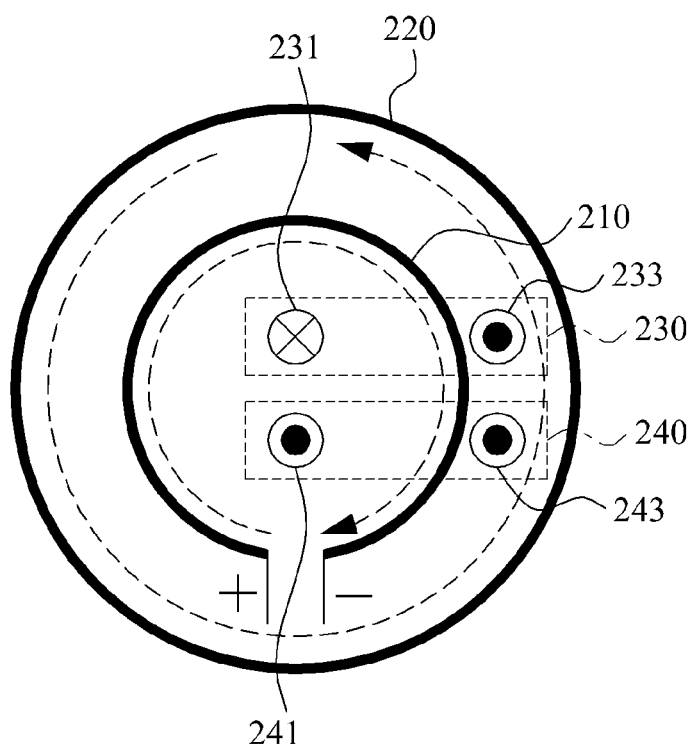
FIGS. 2A and 2B are diagrams illustrating examples of a distribution of a magnetic field in a feeder and a source resonator.
Figure 2B:
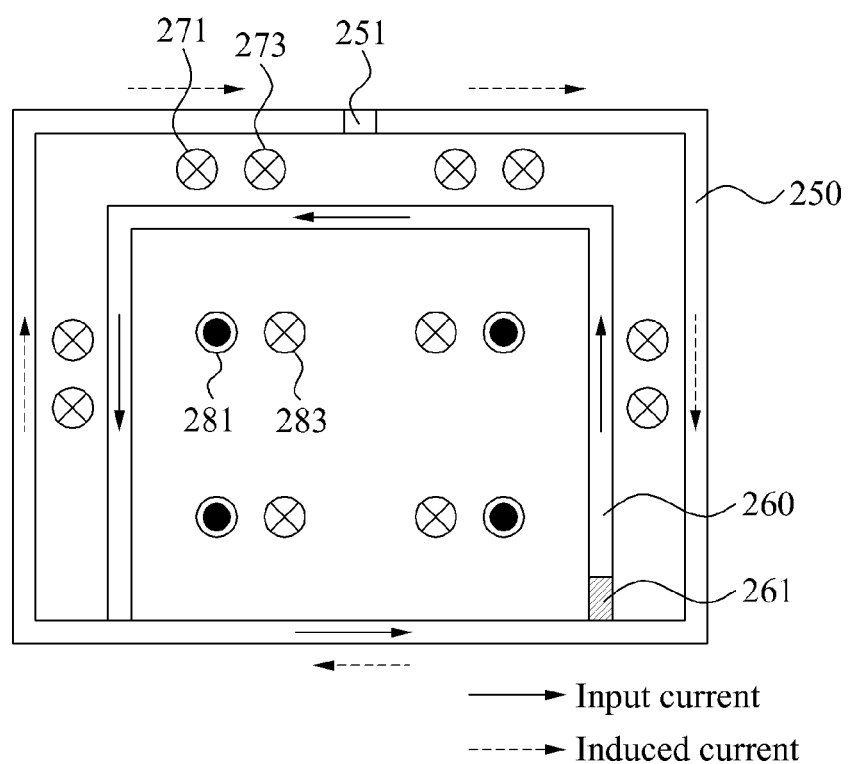

FIGS. 2A and 2B illustrate examples of a distribution of a magnetic field in a feeder and a resonator. In an example in which a resonator receives power supply through a separate feeder, magnetic fields are formed in both the feeder and the resonator.

Referring to FIG. 2A, as an input current flows in a feeder 210, a magnetic field 230 is formed. A direction 231 of the magnetic field 230 within the feeder 210 has a phase opposite to a phase of a direction 233 of the magnetic field 230 outside the feeder 210. The magnetic field 230 causes an induced current to be formed in a source resonator 220. Here, a direction of the induced current is opposite to a direction of the input current.

Due to the induced current, a magnetic field 240 is formed in the source resonator 220. Directions of a magnetic field formed due to an induced current in all positions of the source resonator 220 are identical. Accordingly, a direction 241 of the magnetic field 240 formed by the source resonator 220 has the same phase as a direction 243 of the magnetic field 240 formed by the source resonator 220.

Consequently, when the magnetic field 230 formed by the feeder 210 and the magnetic field 240 formed by the source resonator 220 are combined, strength of a total magnetic field decreases within the feeder 210, but increases outside the feeder 210. In an example in which a power is supplied to the source resonator 220 through the feeder 210, the strength of the total magnetic field decreases in the center of the source resonator 220, but increases in outer edges of the source resonator 220. When a magnetic field is randomly distributed in the source resonator 220, it may be difficult to perform impedance matching since an input impedance may frequently vary. Additionally, when the strength of the total magnetic field is increased, an efficiency of wireless power transmission is increased. Conversely, when the strength of the total magnetic field is decreased, the efficiency for wireless power transmission is reduced. Accordingly, a power transmission efficiency is reduced on average.

As an example, in a target resonator, a magnetic field may be distributed as illustrated in FIG. 2A. For example, a current flowing in the source resonator 220 is induced by the input current flowing in the feeder 210. A current flowing in the target resonator is induced by a magnetic coupling between the source resonator 220 and the target resonator. The current flowing in the target resonator cases a magnetic field to be formed so that an induced current is generated in a feeder located in the target resonator. In this example, within the feeder, a direction of a magnetic field formed by the target resonator has a phase opposite to a phase of a direction of a magnetic field formed by the feeder and accordingly, strength of a total magnetic field is reduced.

FIG. 2B illustrates a structure of a wireless power transmitter in which a source resonator 250 and a feeder 260 have a common ground. The source resonator 250 includes a capacitor 251. The feeder 260 receives an input of a radio frequency (RF) signal via a port 261.

For example, when the RF signal is received to the feeder 260, an input current is generated in the feeder 260. The input current flowing in the feeder 260 causes a magnetic field to be formed, and a current is induced in the source resonator 250 by the magnetic field. Additionally, another magnetic field is formed due to the induced current flowing in the source resonator 250. In this example, a direction of the input current flowing in the feeder 260 has a phase opposite to a phase of a direction of the induced current flowing in the source resonator 250. Accordingly, in a region between the source resonator 250 and the feeder 260, a direction 271 of the magnetic field formed due to the input current has the same phase as a direction 273 of the magnetic field formed due to the induced current, and thus the strength of a total magnetic field increases. Conversely, within the feeder 260, a direction 281 of the magnetic field formed due to the input current has a phase opposite to a phase of a direction 283 of the magnetic field formed due to the induced current, and thus the strength of the total magnetic field decreases. Therefore, the strength of the total magnetic field decreases in the center of the source resonator 250, but increases in outer edges of the source resonator 250.

The feeder 260 determines an input impedance by adjusting an internal area of the feeder 260. The input impedance refers to an impedance viewed in a direction from the feeder 260 to the source resonator 250. When the internal area of the feeder 260 is increased, the input impedance is increased. Conversely, when the internal area of the feeder 260 is reduced, the input impedance is reduced. Since the magnetic field is randomly distributed in the source resonator 250 despite a reduction in the input impedance, a value of the input impedance varies depending on a location of a target device.

Accordingly, a separate matching network is required to match the input impedance to an output impedance of a PA. For example, when the input impedance is increased, a separate matching network is used to match the increased input impedance to a relatively low output impedance. As an example, when a target resonator has the same configuration as the source resonator 250, and when a feeder of the target resonator has the same configuration as the feeder 260, a separate matching network is required, because a direction of a current flowing in the target resonator has a phase opposite to a phase of a direction of an induced current flowing in the feeder of the target resonator.

Figure 3A:
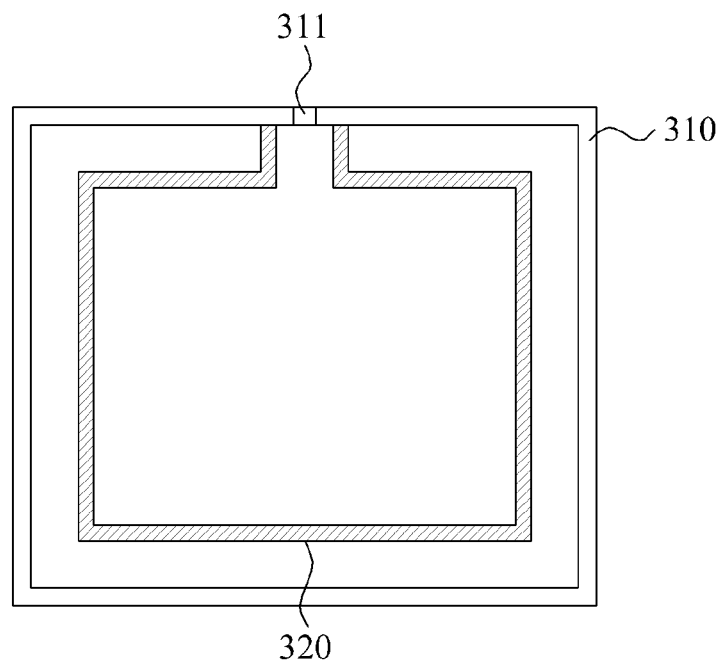
FIGS. 3A and 3B are diagrams illustrating an example of a wireless power transmitter.

FIG. 3A illustrates an example of a wireless power transmitter. The wireless power transmitter includes a resonator 310 and a feeding unit 320. The resonator 310 includes a capacitor 311. The feeding unit 320 may be electrically connected to both ends of the capacitor 311.

Figure 3B:
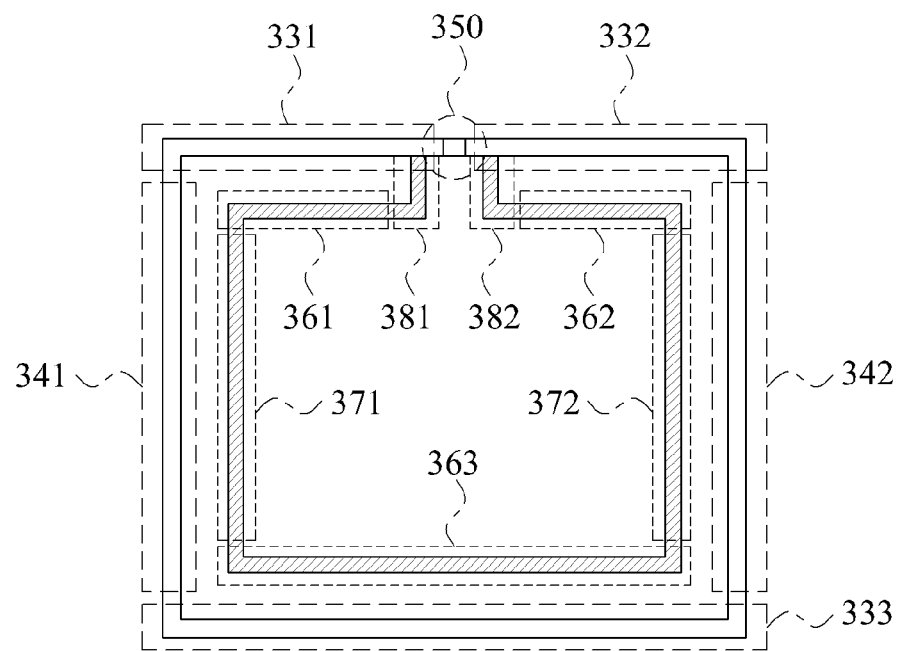

FIG. 3B illustrates, in detail, an example of a structure of the wireless power transmitter of FIG. 3A. The resonator 310 includes a first transmission line, a first conductor 341, a second conductor 342, and at least one first capacitor 350.

The first capacitor 350 is inserted in series between a first signal conducting portion 331 and a second signal conducting portion 332 in the first transmission line, and an electric field is confined within the first capacitor 350. For example, the first transmission line includes at least one conductor in an upper portion of the first transmission line, and includes at least one conductor in a lower portion of the first transmission line. Current flows through the at least one conductor disposed in the upper portion of the first transmission line, and the at least one conductor disposed in the lower portion of the first transmission line is electrically grounded. For example, a conductor disposed in an upper portion of the first transmission line is separated into and thereby referred to as the first signal conducting portion 331 and the second signal conducting portion 332. A conductor disposed in a lower portion of the first transmission line is referred to as a first ground conducting portion 333.

As illustrated in FIG. 3B, the resonator 310 has a two-dimensional (2D) structure. The first transmission line includes the first signal conducting portion 331 and the second signal conducting portion 332 in the upper portion of the first transmission line. In addition, the first transmission line includes the first ground conducting portion 333 in the lower portion of the first transmission line. The first signal conducting portion 331 and the second signal conducting portion 332 are disposed to face the first ground conducting portion 333. The current flows through the first signal conducting portion 331 and the second signal conducting portion 332.

Additionally, one end of the first signal conducting portion 331 is shorted to the first conductor 341, and another end of the first signal conducting portion 331 is connected to the first capacitor 350. One end of the second signal conducting portion 332 is shorted to the second conductor 342, and another end of the second signal conducting portion 332 is connected to the first capacitor 350. Accordingly, the first signal conducting portion 331, the second signal conducting portion 332, the first ground conducting portion 333, and the conductors 341 and 342 are connected to each other, so that the resonator 310 has an electrically closed-loop structure. The term "loop structure" may include, for example, a polygonal structure such as a circular structure, a rectangular structure, and/or the like. "Having a loop structure" may indicate that the circuit is electrically closed.

The first capacitor 350 is inserted into an intermediate portion of the first transmission line. For example, the first capacitor 350 is inserted into a space between the first signal conducting portion 331 and the second signal conducting portion 332. The first capacitor 350 may have a shape of, for example, a lumped element, a distributed element, and/or the like. For example, a distributed capacitor having the shape of the distributed element may include zigzagged conductor lines and a dielectric material that has a high permittivity between the zigzagged conductor lines.

When the first capacitor 350 is inserted into the first transmission line, the resonator 310 has a characteristic of a metamaterial. The metamaterial indicates a material having a predetermined electrical property that has not been discovered in nature, and thus, has an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into, for example, an epsilon negative (ENG) material, a mu negative (MNG) material, a double negative (DNG) material, a negative refractive index (NRI) material, a left-handed (LH) material, and/or the like, based on a sign of the corresponding permittivity or magnetic permeability.

When a capacitance of the first capacitor 350 inserted as the lumped element is appropriately determined, the resonator 310 has the characteristic of the metamaterial. Because the resonator 310 may have a negative magnetic permeability by appropriately adjusting the capacitance of the first capacitor 350, the resonator 310 may also be referred to as an MNG resonator. Various criteria may be applied to determine the capacitance of the first capacitor 350. For example, the various criteria may include, for example, a criterion that enables the resonator 310 to have the characteristic of the metamaterial, a criterion that enables the resonator 310 to have a negative magnetic permeability in a target frequency, a criterion that enables the resonator 310 to have a zeroth order resonance characteristic in the target frequency, and/or the like. Based on at least one criterion among the aforementioned criteria, the capacitance of the first capacitor 350 is determined.

The resonator 310, also referred to as the MNG resonator 310, may have a zeroth order resonance characteristic of having, as a resonant frequency, a frequency when a propagation constant is 0. Because the resonator 310 may have the zeroth order resonance characteristic, the resonant frequency may be independent with respect to a physical size of the MNG resonator 310. By appropriately designing the first capacitor 350, the MNG resonator 310 may sufficiently change the resonant frequency. Accordingly, the physical size of the MNG resonator 310 may not be changed.

In a near field, the electric field is concentrated on the first capacitor 350 inserted into the first transmission line. Accordingly, due to the first capacitor 350, the magnetic field becomes dominant in the near field. The MNG resonator 310 may have a relatively high Q-factor using the first capacitor 350 of the lumped element, and thus, it is possible to enhance an efficiency of power transmission. For example, the Q-factor may indicate a level of an ohmic loss or a ratio of a reactance with respect to a resistor in the wireless power transmission. The efficiency of the wireless power transmission may increase according to an increase in the Q-factor.

Although not illustrated in FIG. 3B, a magnetic core may be further provided to pass through the MNG resonator 310. The magnetic core may perform a function of increasing a power transmission distance.

Referring to FIG. 3B, the feeding unit 320 includes a second transmission line, a third conductor 371, a fourth conductor 372, a fifth conductor 381, and a sixth conductor 382. The second transmission line includes a third signal conducting portion 361 and a fourth signal conducting portion 362 in an upper portion of the second transmission line. In addition, the second transmission line includes a second ground conducting portion 363 in a lower portion of the second transmission line. The third signal conducting portion 361 and the fourth signal conducting portion 362 are disposed to face the second ground conducting portion 363. Current flows through the third signal conducting portion 361 and the fourth signal conducting portion 362.

Additionally, one end of the third signal conducting portion 361 is shorted to the third conductor 371, and another end of the third signal conducting portion 361 is connected to the fifth conductor 381. One end of the fourth signal conducting portion 362 is shorted to the fourth conductor 372, and another end of the fourth signal conducting portion 362 is connected to the sixth conductor 382. The fifth conductor 381 is connected to the first signal conducting portion 331, and the sixth conductor 382 is connected to the second signal conducting portion 332. The fifth conductor 381 and the sixth conductor 382 are connected in parallel to both ends of the first capacitor 350. Here, the fifth conductor 381 and the sixth conductor 382 are used as input ports to receive an input of an RF signal.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, so that the resonator 310 and the feeding unit 320 have an electrically closed-loop structure. The term "loop structure" may include, for example, a polygonal structure such as a circular structure, a rectangular structure, and/or the like. When an RF signal is received via the fifth conductor 381 or the sixth conductor 382, an input current flows in the feeding unit 320 and the resonator 310, a magnetic field is formed due to the input current, and a current is induced to the resonator 310 by the formed magnetic field. A direction of the input current flowing in the feeding unit 320 is identical to a direction of the induced current flowing in the resonator 310 and thus, strength of a total magnetic field increases in the center of the resonator 310, but decreases in outer edges of the resonator 310.

An input impedance is determined based on an area of a region between the resonator 310 and the feeding unit 320 and accordingly, a separate matching network used to match the input impedance to an output impedance of a power amplifier is not be required. For example, even when the matching network is used, the input impedance is determined by adjusting a size of the feeding unit 320 and thus, a structure of the matching network is simplified. The simplified structure of the matching network minimizes a matching loss of the matching network.

The second transmission line, the third conductor 371, the fourth conductor 372, the fifth conductor 381, and the sixth conductor 382 form the same structure as the resonator 310. In an example in which the resonator 310 has a loop structure, the feeding unit 320 may also have a loop structure. In another example in which the resonator 310 has a circular structure, the feeding unit 320 may also have a circular structure.

Figure 4A:
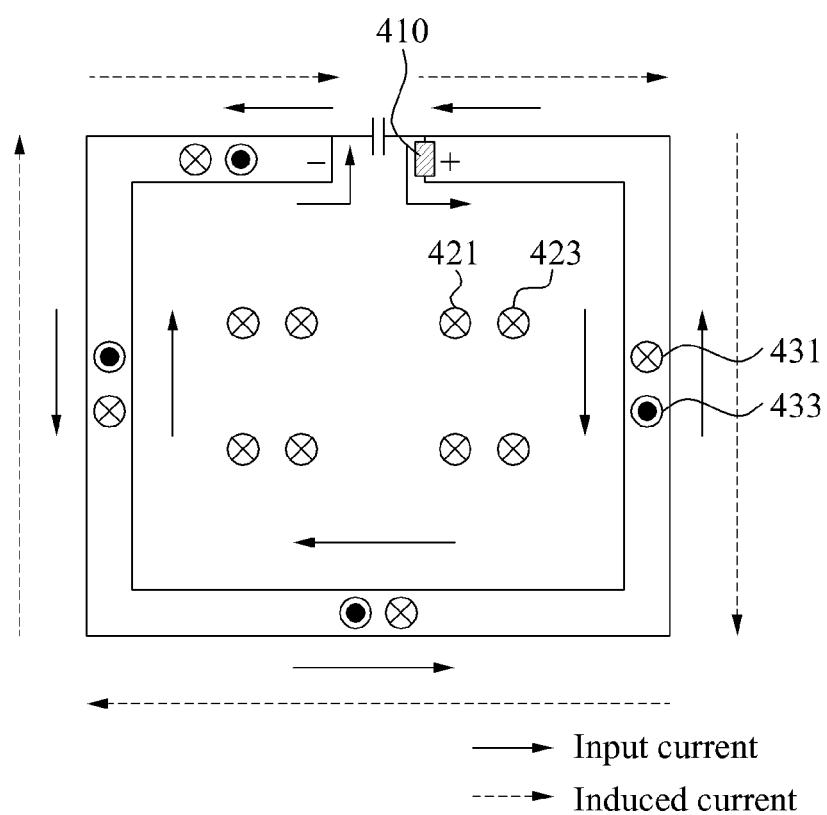
FIG. 4A is a diagram illustrating an example of a distribution of a magnetic field within a source resonator based on feeding of a feeding unit.
Figure 4B:
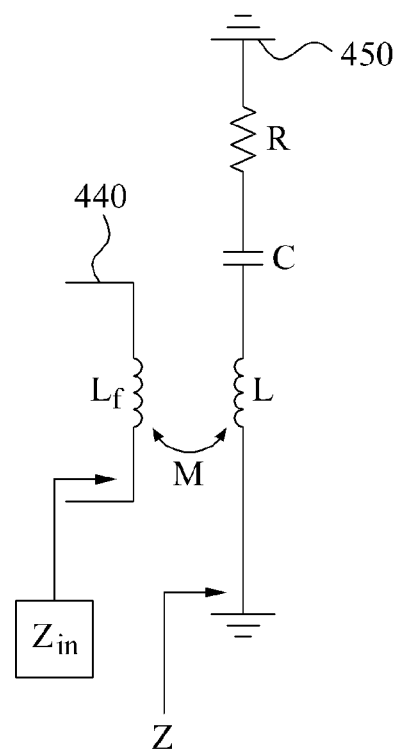
FIG. 4B is a diagram illustrating examples of equivalent circuits of a feeding unit and a source resonator.

FIG. 4A illustrates an example of a distribution of a magnetic field within a resonator based on feeding of a feeding unit. For example, FIG. 4A more briefly illustrates the resonator 310 and the feeding unit 320 of FIG. 3A. FIG. 4B illustrates an example of an equivalent circuit of a feeding unit 440, and an equivalent circuit of a resonator 450.

A feeding operation in a wireless power transmission may refer to supplying a power to a source resonator, or may refer to supplying an AC power to a rectification unit. FIG. 4A illustrates a direction of an input current flowing in the feeding unit, and a direction of an induced current induced in the source resonator. Additionally, FIG. 4A illustrates a direction of a magnetic field formed due to the input current of the feeding unit, and a direction of a magnetic field formed due to the induced current of the source resonator.

Referring to FIG. 4A, a fifth conductor or a sixth conductor of the feeding unit may be used as an input port 410. The input port 410 receives an input of an RF signal. The RF signal may be output from a PA. The PA may increase or decrease an amplitude of the RF signal on demand by a target device. The RF signal received by the input port 410 is shown in the form of an input current flowing in the feeding unit. The input current flows in a clockwise direction in the feeding unit, along a transmission line of the feeding unit. The fifth conductor of the feeding unit is electrically connected to the resonator. For example, the fifth conductor may be connected to a first signal conducting portion of the resonator. Accordingly, the input current flows in the resonator, as well as, in the feeding unit. The input current flows in a counterclockwise direction in the resonator. The input current flowing in the resonator causes a magnetic field to be formed so that an induced current is generated in the resonator due to the magnetic field. The induced current flows in a clockwise direction in the resonator. Here, the induced current transfers energy to a capacitor of the resonator, and a magnetic field is formed due to the induced current. The input current flowing in the feeding unit and the resonator is indicated by a solid line of FIG. 4A, and the induced current flowing in the resonator is indicated by a dotted line of FIG. 4A.

A direction of a magnetic field formed due to a current is determined based on the right hand rule. As illustrated in FIG. 4A, within the feeding unit, a direction 421 of a magnetic field formed due to the input current flowing in the feeding unit is identical to a direction 423 of a magnetic field formed due to the induced current flowing in the resonator. Accordingly, strength of a total magnetic field increases within the feeding unit.

Additionally, in a region between the feeding unit and the resonator, a direction 433 of a magnetic field formed due to the input current flowing in the feeding unit has a phase opposite to a phase of a direction 431 of a magnetic field formed due to the induced current flowing in the resonator, as illustrated in FIG. 4A. Accordingly, strength of the total magnetic field decreases in the region between the feeding unit and the resonator.

Typically, a strength of a magnetic field decreases in the center of a resonator with the loop structure, and increases in outer edges of the resonator. However, referring to FIG. 4A, the feeding unit is electrically connected to both ends of a capacitor of the resonator, and accordingly the induced current of the resonator flows in the same direction as the input current of the feeding unit. Since the induced current of the resonator flows in the same direction as the input current of the feeding unit, the strength of the total magnetic field increases within the feeding unit, and decreases outside the feeding unit. As a result, the strength of the total magnetic field increases in the center of the resonator with the loop structure, and decreases in the outer edges of the resonator, due to the feeding unit. Thus, the strength of the total magnetic field is equalized within the resonator.

Additionally, a power transmission efficiency of transferring a power from a source resonator to a target resonator is in proportion to the strength of the total magnetic field formed in the source resonator. In other words, when the strength of the total magnetic field increases in the center of the source resonator, the power transmission efficiency also increases.

Referring to FIG. 4B, the feeding unit 440 and the resonator 450 may be expressed by the equivalent circuits. An input impedance $Z_{in}$ viewed in a direction from the feeding unit 440 to the resonator 450 may be computed, as given in Equation 4.

$$Z_{in} = \frac{(\omega M)^2}{Z} \quad \text{[Equation 4]}$$

In Equation 4, M denotes a mutual inductance between the feeding unit 440 and the resonator 450, ω denotes a resonant frequency between the feeding unit 440 and the resonator 450, and Z denotes an impedance viewed in a direction from the resonator 450 to a target device. The input impedance $Z_{in}$ may be in proportion to the mutual inductance M. Accordingly, the input impedance $Z_{in}$ may be controlled by adjusting the mutual inductance M. The mutual inductance M may be adjusted based on an area of a region between the feeding unit 440 and the resonator 450. The area of the region between the feeding unit 440 and the resonator 450 may be adjusted based on a size of the feeding unit 440. In other words, the input impedance $Z_{in}$ may be determined based on the size of the feeding unit 440, and thus a separate matching network may not be required to perform impedance matching with an output impedance of a PA.

In a target resonator and a feeding unit included in a wireless power receiver, a magnetic field may be distributed as illustrated in FIG. 4A. For example, the target resonator may receive a wireless power from a source resonator, using magnetic coupling. Due to the received wireless power, an induced current may be generated in the target resonator. A magnetic field formed due to the induced current in the target resonator may cause another induced current to be generated in the feeding unit. In this example, when the target resonator is connected to the feeding unit as illustrated in FIG. 4A, the induced current generated in the target resonator may flow in the same direction as the induced current generated in the feeding unit. Thus, strength of a total magnetic field may increase within the feeding unit, but may decrease in a region between the feeding unit and the target resonator.

Figure 5:
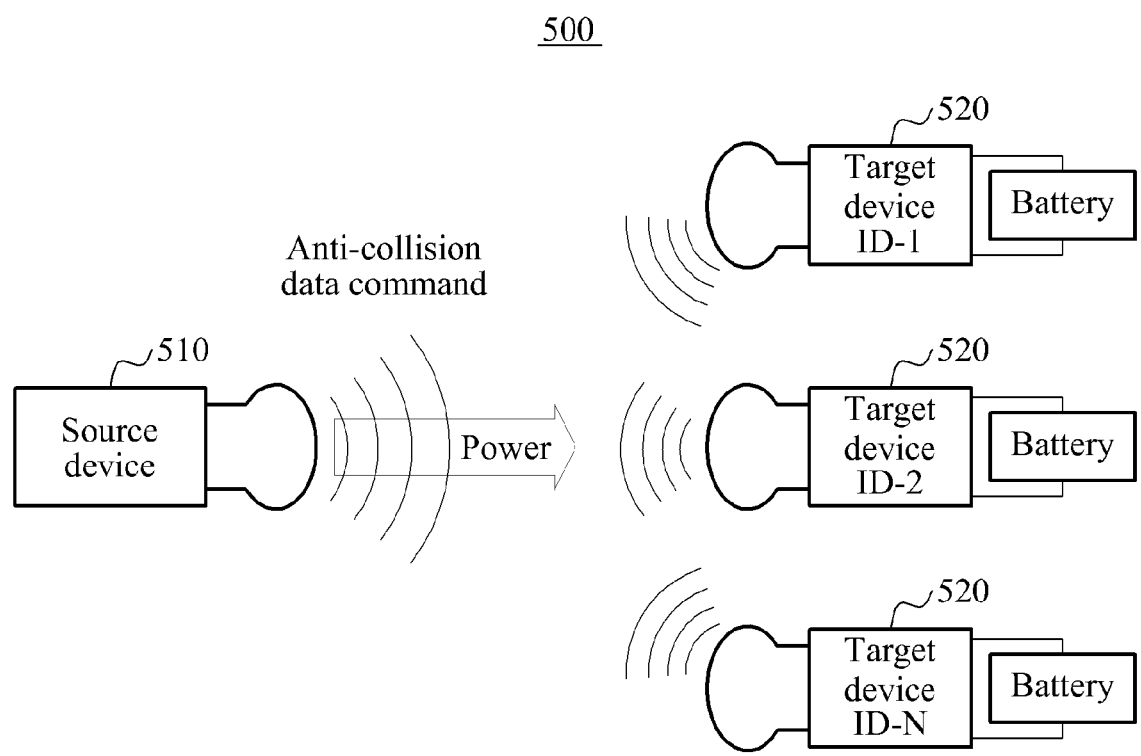
FIG. 5 is a diagram illustrating an example of a multi-target device communication environment.

FIG. 5 illustrates an example of a multi-target device communication environment. A wireless power transmission and charging system 500 includes a single source device 510 and at least one target device 520. The source device 510 and the target device 520 may be, for example, the source device 110 and the target device 120 of FIG. 1, respectively.

The source device 510 transmits power to the at least one target device 520. The source device 510 also outputs an anti-collision data command. The at least one target device 520 respectively includes at least one battery.

In an example, a plurality of target devices, including the target device 520, may simultaneously approach a resonator of the source device 510, or may exist within a range of the resonator of the source device 510. When a power is supplied to the source device 510, data collision may occur during an operation for initial connection between the plurality of target devices and the source device 510. Due to the data collision, a normal charging operation may not be performed.

Figure 6:
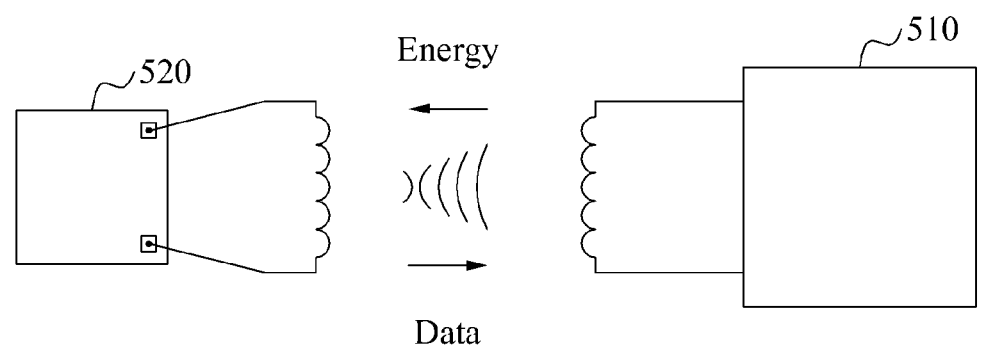
FIG. 6 is a diagram illustrating an example of a mode of a wireless power transmission and charging system of FIG. 5.

FIG. 6 illustrates an example of a mode of the wireless power transmission and charging system 500 of FIG. 5. The wireless power transmission and charging system 500 may be operated in three modes, in terms of software. The three modes may include, for example, a standby mode, a connection mode, and a transmission and charging control mode.

The standby mode includes a state in which no target device 520 exists within a power transmission distance of the source device 510. The connection mode includes a mode in which the source device 510 verifies information on a type and a serial number of the target device 520, and on an amount of power used by the target device 520, through an initial connection between the source device 510 and the target device 520. The source device 510 controls the target device 520 to enter the transmission and charging control mode. The initial connection may be performed when the target device 520 exists within the power transmission distance of the source device 510.

In the connection mode, a plurality of target devices, including the target device 520, may simultaneously send a connection request (e.g., data) to the single source device 510. Hereinafter, a method of processing one-to-one communication to be performed between the source device 510 and each of the target devices when the target devices simultaneously send a connection request to the source device 510, will be further described.

The transmission and charging control mode includes a state in which the source device 510 communicates with the target device 520 through a slot assigned by the source device 510 to the target device 520 in the connection mode, and in which the source device 510 transmits energy or power to charge the target device 520. In terms of the source device 510, an overall operation of the wireless power transmission and charging system 500 is classified. For example, in the single target device 520, the standby mode, the connection mode, and the transmission and charging control mode, may be sequentially repeated. In another example, the single source device 510 and N target devices, including the target device 520, may perform complex and repetitive operations. For example, when a portion of the plurality of target devices (e.g., the target device 520) is in the charging mode, another portion of the target devices may be completely charged already, and a new target device may try to perform the connection mode with the source device 510.

Figure 7:
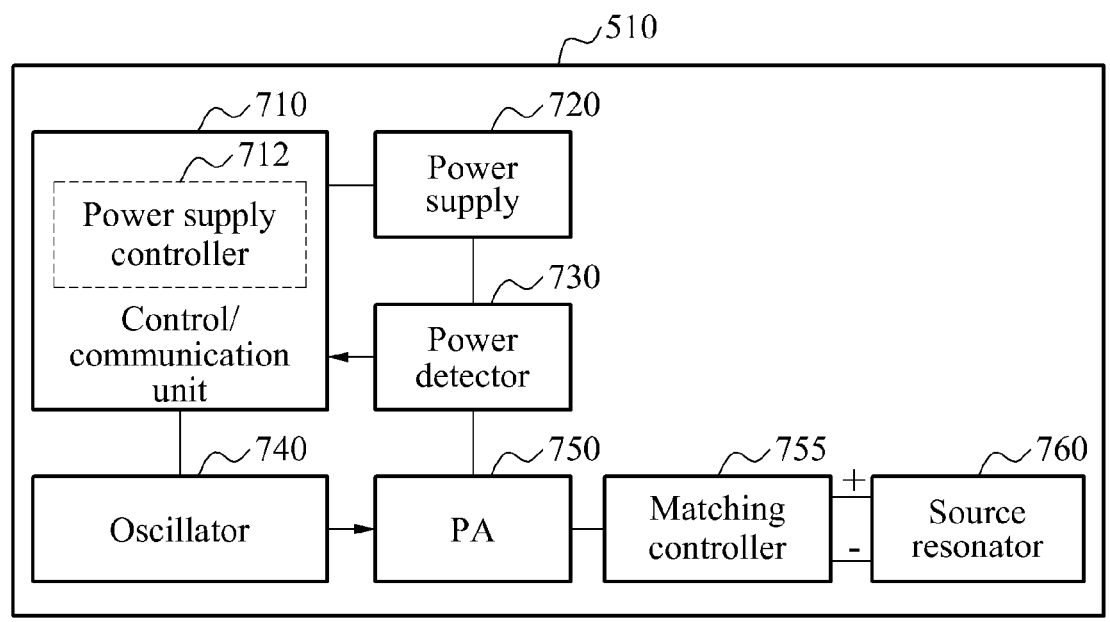
FIG. 7 is a block diagram illustrating an example of a configuration of a source device of FIG. 5.

FIG. 7 illustrates an example of a configuration of the source device 510. The source device 510 includes a control/communication unit 710, a power supply 720, a power detector 730, an oscillator 740, a PA 750, a matching controller 755, and a source resonator 760 (namely, a transmission (Tx) resonator).

The control/communication unit 710 may be, for example, the control/communication unit 115 of FIG. 1. The power supply 720 may be, for example, the power supply 112 and the AC/DC converter 111 of FIG. 1. Additionally, the power detector 730 may be, for example, the power detector 113 of FIG. 1. The PA 750 may be, for example, the power converter 114 of FIG. 1, and the source resonator 760 may be, for example, the source resonator 116 of FIG. 1. The control/communication unit 710 may include a power supply controller 712, or the source device 510 may further include the power supply controller 712.

The oscillator 740 generates a signal with a frequency in a band of a few KHz to tens of MHz. The generated signal may be the switching pulse signal of FIG. 1. The signal generated by the oscillator 740 is applied to the PA 750. The oscillator 740 may change the frequency of the signal, and a matching schematic. The control/communication unit 710 may control the oscillator 740 to change the frequency of the generated signal and the matching schematic.

The power supply 720 may be, for example, a switching mode power supply. The power supply controller 712 controls the power supply 720. For example, the power supply controller 712 controls the power supply 720 to apply a supply power to the PA 750. The power applied to the PA 750 by the power supply 720 may be referred to as a "PA supply power." Additionally, the power supply controller 712 may control the power supply 720 to adjust a voltage applied to the PA 750. The voltage applied to the PA 750 by the power supply 720 may be referred to as a "PA supply voltage." When the power supply 720 adjusts the PA supply voltage, current supplied to the PA 750 is also adjusted.

The PA 750 may be, for example, a variable switching amplifier. The PA 750 may be designed as a switching amplifier of an E-class. A power output by the PA 750 is determined based on a frequency of a signal applied from the oscillator 740, and the supply power applied from the power supply 720. The power output by the PA 750 may be referred to as a "PA power". Additionally, a PA current may refer to a current supplied to the PA 750 when the power supply controller 712 controls the power supply 720. A PA voltage may refer to a voltage of the PA power.

The source resonator 760 transmits, to a target device (e.g., the target device 520 in FIG. 6), the PA power as an electromagnetic energy. The matching controller 755 may be, for example, a matching circuit. The matching controller 755 changes a matching impedance and a matching frequency. The control/communication unit 710 controls the matching controller 755 to change a matching impedance and a matching frequency.

The power detector 730 detects a current and voltage of the supply power output by the power supply 720, and transmits, to the control/communication unit 710, information on the detected current and the detected voltage. For example, the power detector 730 detects either the PA power, or the PA current and the PA voltage, and transmits, to the control/communication unit 710, information on either the detected PA power, or the detected PA current and the detected PA voltage. Additionally, the power detector 730 monitors power supply to the target device by detecting a change in a load and a change in a mode of the target device. The power detector 730 uses the detected change in the load and the detected change in the mode to demodulate a modulated load of the target device.

Figure 8:
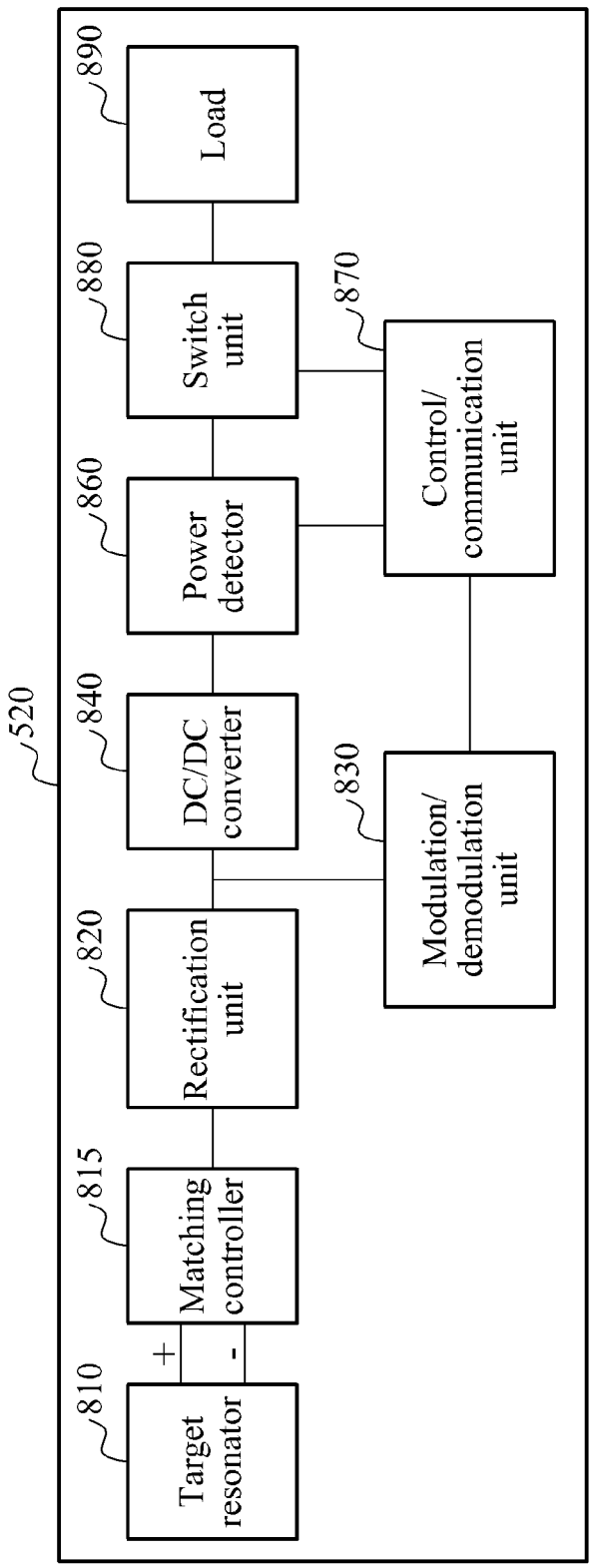
FIG. 8 is a block diagram illustrating an example of a configuration of a target device of FIG. 5.

FIG. 8 illustrates an example of a configuration of the target device 520. The target device 520 includes a target resonator 810, a matching controller 815, a rectification unit 820, a modulation and demodulation (modulation/demodulation) unit 830, a DC/DC converter 840, a power detector 860, a control/communication unit 870, a switch unit 880, and a load 890. The target resonator 810, the rectification unit 820, the DC/DC converter 840, the control/communication unit 870, the switch unit 880, and the load 890 may be, for example, the target resonator 121, the rectification unit 122, the DC/DC converter 123, the control/communication unit 126, the switch unit 124, and the charging unit 125 of FIG. 1, respectively.

The target resonator 810 receives an electromagnetic energy from a source resonator of a source device, e.g., the source resonator 760 of the source device 510 in FIG. 7. For example, the target resonator 810 receives a power from the source device through a magnetic coupling with the source resonator. The received power may be used as a communication power or charging power. Additionally, the target resonator 810 may receive various messages from the source device through in-band communication.

The matching controller 815 performs impedance matching between the target resonator 810 and the rectification unit 820. The matching controller 815 may be, for example, a matching circuit. The matching controller 815 may change a matching impedance and a matching frequency. The control/communication unit 870 may control the matching controller 815 to change a matching impedance and a matching frequency.

The rectification unit 820 generates a DC voltage by rectifying an AC voltage output from the target resonator 810. In other words, the rectification unit 820 rectifies the AC voltage received via the target resonator 810.

The DC/DC converter 840 adjusts a level of the DC voltage output from the rectification unit 820 based on a capacitance of the load 890. For example, the DC/DC converter 840 may adjust the level of the DC voltage to 3 V through 10 V.

The power detector 860 detects an output power and an output voltage of the DC/DC converter 840. The power detector 860 transfers, to the control/communication unit 870, the detected output power and the detected output voltage.

The switch unit 880 is turned on or off under the control of the control/communication unit 870. For example, when the target device 520 or the load 890 is completely charged, the switch unit 880 is turned off. When the switch unit 880 is turned off, the control/communication unit (e.g., the control/communication unit 710 in FIG. 7) of the source device detects a power received by the target device 520. In other words, when the switch unit 880 is turned off, a magnetic coupling between the source resonator and the target resonator 810 is eliminated.

The load 890 may include a battery. The load 890 may include the charging unit 125 of FIG. 1. The load 890 is charged using a DC voltage output from the DC/DC converter 840.

The control/communication unit 870 may perform in-band communication with the source device using a resonant frequency. To perform the in-band communication, the control/ communication unit 870 may use the modulation/demodulation unit 830. For example, the control/communication unit 870 may include the modulation/demodulation unit 830, and a function of the modulation/demodulation unit 830 may be performed by the control/communication unit 870.

The modulation/demodulation unit 830 may detect a signal transmitted between the target resonator 810 and the rectification unit 820, or may detect an output signal of the rectification unit 820. The modulation/demodulation unit 830 demodulates a signal received by the target device 520. For example, the modulation/demodulation unit 830 may demodulate the signal received by the target device 520 through the in-band communication. Additionally, the modulation/demodulation unit 830 demodulates a signal to be transmitted to the source device by adjusting an impedance of the target resonator 810, or by turning on or off the switch unit 880.

Figure 9:
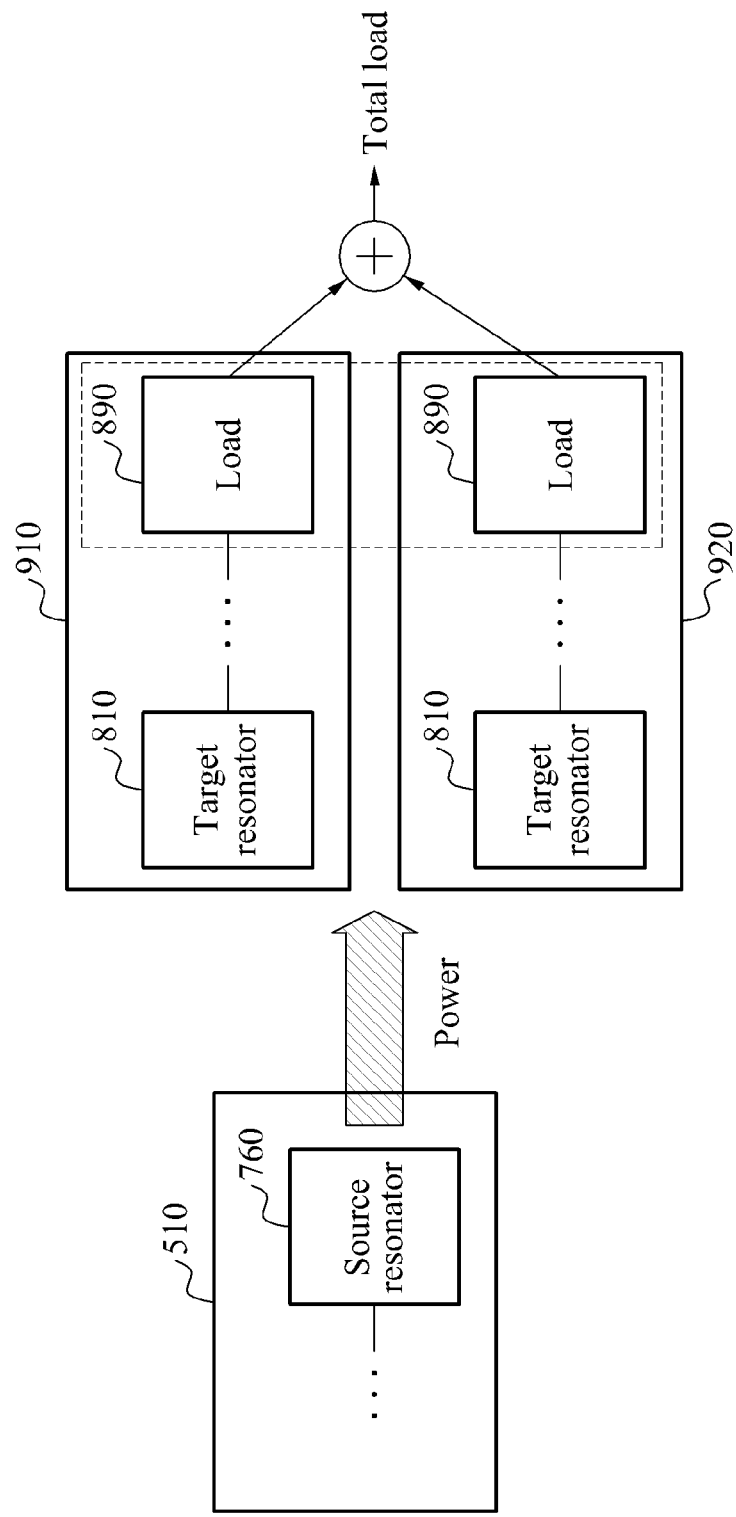
FIG. 9 is a diagram illustrating an example of a fluctuation in a target load.

FIG. 9 illustrates an example of a fluctuation in a target load. Two target devices 910 and 920 are illustrated. Types of controlling of a wirelessly transmitted power may include, for example, controlling an initial power, controlling a power based on a change in a target load, controlling a power based on a change from a constant current (CC) mode to a constant voltage (CV) mode, and/or the like.

The controlling of the initial power may refer to controlling and transmitting a wirelessly transmitted power when the source device 510 and the target device 910 or 920 start a connection. In a wireless power transmission system, the source resonator 760 and the target resonator 810 may differ from each other in efficiency according to manufacturers or products. Accordingly, power needs to be transmitted by controlling the initial power based on an efficiency difference between the source resonator 760 and target resonator 810, and thus, a required power of the target device 910 or 920 may be appropriately transmitted.

Additionally, when a number of currently charged target devices 910 and 920 is changed, or a battery charging mode of the target device 910 or 920 is changed, a target load (e.g., total load) is changed. The battery charging mode may be changed, for example, from the CC mode to the CV mode.

The target load may refer to a load measured in an output end of a PA (e.g., the PA 750 in FIG. 7), that is, a load of a target device connected to the output end of the PA. The target load may be changed due to a change in a number of the target devices 910 and 920 that are being charged through the source device 510, or a change in the battery charging mode of the target device 910 or 920.

For example, when the target load is changed, power matched to a load (e.g., the load 890) changed by the controlling of the power based on the change in the target load, needs to be transmitted. The controlling of the power based on the change in the target load may refer to controlling and transmitting the power based on the changed load, e.g., the load 890.

To detect a change in the target load, in the PA, first, current of the PA, namely, a PA current is detected. Second, a change in the target load is detected based on a change in the detected PA current. When the PA current is increased during charging, it is determined that a load (e.g., the load 890) is added to the target load.

In more detail, in a charging state, the source device 510 recognizes the target device 910 or 920, and supplies a required power to the target device 910 or 920. The control/communication unit (e.g., the control/communication unit 710 in FIG. 7) or the power supply controller (e.g., the power supply controller 712) may control the power supply (e.g., the power suppy 720) to provide the PA (e.g., the PA 750) with a controlled PA supply power. The control/communication unit verifies a PA current and a charging state via communication. For example, the power detector (e.g., the power detector 730) detects the change in the PA current. When the PA current is increased above a reference current value, the control/communication unit determines that the load 890 is added to the target load. That is, the control/communication unit recognizes the added load 890, and controls the PA power accordingly.

When the PA current is reduced during charging, it is determined that the target load is reduced, e.g., the load 890 is removed from the target load. In an example in which the source device 510 is in the charging state, when a PA current detected by the power detector is reduced below a current value detected during charging, the control/communication unit determines that the target load is changed, e.g., the load 890 is removed from the target load. The control/communication unit verifies a state of the target device 910 or 920, and controls the PA supply power accordingly.

When charging is started or is already performed, and when the PA current is equal to or less than a reference current, it is determined that there is no target device 910 or 920 to be charged or within a distance of the source device 510. When there is no target device 910 or 920, only the source resonator 760 is regarded as a load of the PA. For example, the control/communication unit determines whether the target device 910 or 920 is to be charged or is within a distance of the source device 510, according to an output of the PA (for example, the PA current) compared to a PA current when there is no load.

In order for the source device 510 to control power and detect a target load or total load, several conditions need to be satisfied. For example, to supply a power required by the target device 910 or 920 based on a change in the load 890, the PA needs to output a power matched to the target load. To output the power matched to the target load, the following two conditions need to be satisfied.

First, an impedance matching condition needs to be satisfied. An impedance in a source side needs to satisfy a matching condition for a load impedance. The impedance in the source side may include, for example, an impedance of the source device 510 including the source resonator 760, and an impedance of the target resonator 810.

A value of a reflection coefficient is used to determine whether the matching condition is satisfied. The reflection coefficient may be computed by Equation 5.

$$\Gamma = \frac{V_r}{V_i} = \frac{Z_L - Z_o}{Z_L + Z_o} \qquad \text{[Equation 5]}$$

In Equation 5, $\Gamma$ denotes a reflection coefficient. $V_i$ denotes an incident wave, and $V_r$ denotes h reflected wave. $Z_o$ denotes a source impedance, and $Z_L$ denotes a load impedance.

Second, a resonant frequency condition between the source device 510 and the target device 910 or 920 needs to be satisfied. The source device 510 and the target device 910 or 920 need to have the same resonant frequency.

The control/communication unit detects a change in the load 890 of the target device 910 or 920 by detecting the PA supply power supplied by the power supply. When the impedance of the source resonator 760 is matched with the impedance of the target resonator 810, the load measured in the output end of the PA is a sum of at least one load 890 of at least one target device 910 or 920. For example, when the load 890 of the target device 910 corresponds to 3 W and the load 890 of the target device 920 corresponds to 3 W, a total load measured in the output end of the PA of the source device 510 is 6 W.

The power output by the PA, namely the PA power, may be determined based on a change in an output load, as given in Equation 6.

$$Pwr = (V_{rms})^2 / R \quad \text{[Equation 6]}$$

In Equation 6, Pwr denotes an output power. R denotes an output load, namely, a target load.

When the output load R decreases, the output power Pwr may increase. When the output load R increases, the output power Pwr may decrease. Based on this, a change in an output or target load may be detected in wirelessly charging. Detecting a change in the target load based on the change in the PA current may be used to control the PA power and to determine whether to communicate with the target device 910 or 920.

Figure 10:
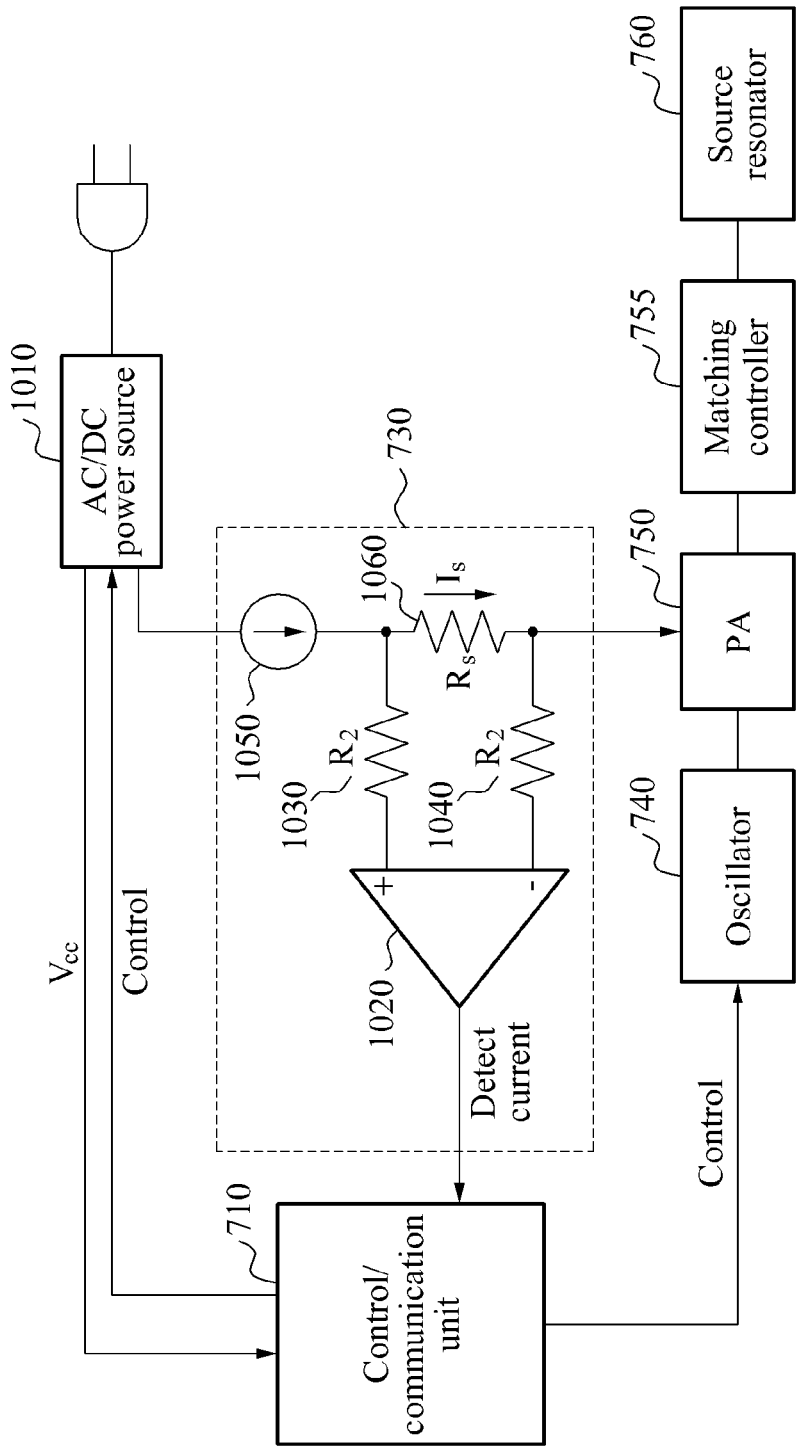
FIG. 10 is a diagram illustrating an example of a configuration of a power detector in the source device.

FIG. 10 illustrates an example of a configuration of the power detector 730 in the source device 510 of FIGS. 5-7 and 9. Referring to FIG. 10, the power detector 730 detects a PA current and transmits the detected PA current to the control/communication unit 710.

The AC/DC power source 1010 functions as, e.g., the power supply 720 of FIG. 7. The control/communication unit 710 receives, from the AC/DC power source 1010, power $V_{cc}$ that is required to operate the control/communication unit 710. The control/communication unit 710 controls the AC/DC power source 1010 to adjust a PA supply power that is output by the AC/DC power source 1010 to the power supply 720. The control/communication unit 710 controls the oscillator 740 to change a frequency of a signal generated by the oscillator 740, and a matching schematic.

The power detector 730 includes a comparator 1020 and a first resistor 1060. The power detector 730 further includes a second resistor 1030, a third resistor 1040, and a current detector 1050.

A first terminal of the first resistor 1060, an output of the AC/DC power source 1010, and a positive terminal of the comparator 1020 are connected to each other. Additionally, a second terminal of the first resistor 1060, an input of the PA 750, and a negative terminal of the comparator 1020 are connected to each other. The PA current flows to the first resistor 1060.

The comparator 1020 controls voltages applied to both the positive terminal and the negative terminal, and outputs the voltages to the control/communication unit 710. The voltages applied to both the positive terminal and the negative terminal of the comparator 1020 are equal to voltages applied to both the first terminal and the second terminal of the first resistor 1060. The control/communication unit 710 verifies a first resistance of the first resistor 1060. Accordingly, the control/communication unit 710 computes a current $I_s$, namely the PA current, flowing in the first resistor 1060 based on a resistance value $R_s$ of the first resistor 1060 and the voltages applied to both the positive terminal and the negative terminal of the comparator 1020. Additionally, the control/communication unit 710 detects a target load based on the computed PA current.

The second resistor 1030 includes a first terminal and a second terminal. The first terminal of the second resistor 1030 is connected to the first terminal of the first resistor 1060. The second terminal of the second resistor 1030 is connected to the positive terminal of the comparator 1020. The third resistor 1040 includes a first terminal and a second terminal. The first terminal of the third resistor 1040 is connected to the second terminal of the first resistor 1060. The second terminal of the third resistor 1040 is connected to the negative terminal of the comparator 1020. The second resistor 1030 and the third resistor 1040 adjust the voltages applied to both the positive terminal and the negative terminal of the comparator 1020.

Figure 11:
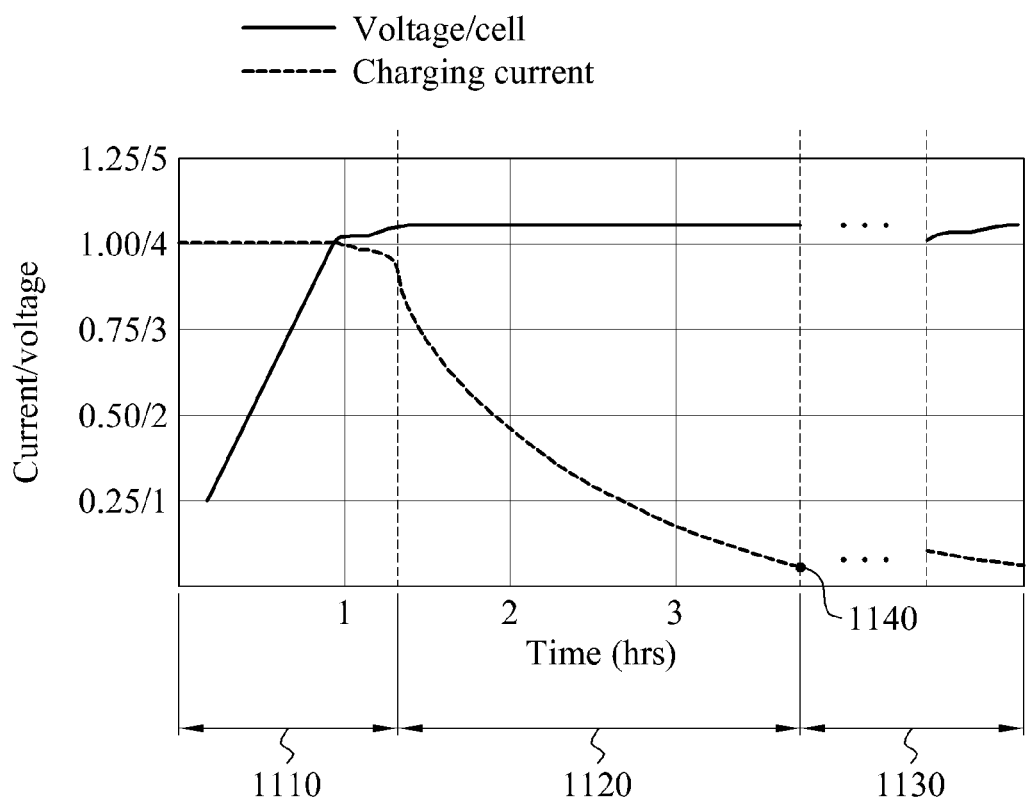
FIG. 11 is a diagram illustrating an example of a change in a battery load.

FIG. 11 illustrates an example of a change in a battery load. In a graph 1100, an x-axis represents time, and a y-axis represents current and/or voltage. Additionally, in the graph 1100, a solid line indicates voltage and/or cell, and a dotted line indicates a charging current.

Prior to charging, the control/communication unit (e.g., 870 in FIG. 8) verifies a voltage or a temperature of a battery, namely the load (e.g., 890). The battery is charged through three operations.

In operation 1110, the battery is charged with a CC. For example, in operation 1110, a maximum charging current is applied to the battery until a charging voltage cell voltage limit is reached.

In operation 1110, for example, a charging current of about 0.5 C to 0.7 C with respect to a battery capacitance may be applied. Here, C denotes the capacitance of the battery. For example, when a battery has a capacitance of 1000 mA, a charging current of about 500 mA to 700 mA is applied to the battery, to charge the battery. The charging voltage may be gradually increased to a range of 4.15 V to 4.2 V.

Operation 1110 may be divided into, for example, a preliminary charging operation and a quick charging operation. In the preliminary charging operation, a charging voltage equal to or less than 3 V may be applied. In the quick charging operation, a charging voltage equal to or greater than 3 V may be applied.

In operation 1120, the battery is charged with a CV. When a charging voltage reaches a maximum cell voltage, as a charging state of the battery comes close to a fully charged state, the charging current starts to drop. In operation 1120, a CV ranging from 4.15 V to 4.2 V may be maintained as a charging voltage. The charging voltage may be computed based on. Equation 7.

$$\text{Charging voltage} = \text{Battery voltage} + \text{Charging current} \times \text{Resistance} \quad \text{[Equation 7]}$$

In Equation 7, the resistance corresponds to a sum of a battery internal resistance and a circuit resistance. As illustrated in Equation 7, as the resistance increases, a voltage charging time may be lengthened.

In a point 1140 at which the charging current is reduced below 3% of a rated current, operation 1120 may be terminated. For example, when the charging current becomes lower than a reference value, for example 3% of the rated current, due to an increase in a charge amount in the battery, the control/communication unit detects a reduced PA current using the power detector (e.g., 730), and terminates the charging.

In operation 1130, topping charging is performed. Topping charge may be applied to the battery intermittently, for example, one time per 500 hours. The specific time, current, and voltage values listed above are merely examples, and other time, current, and voltage values may be used depending on the particular situation.

Figure 12:
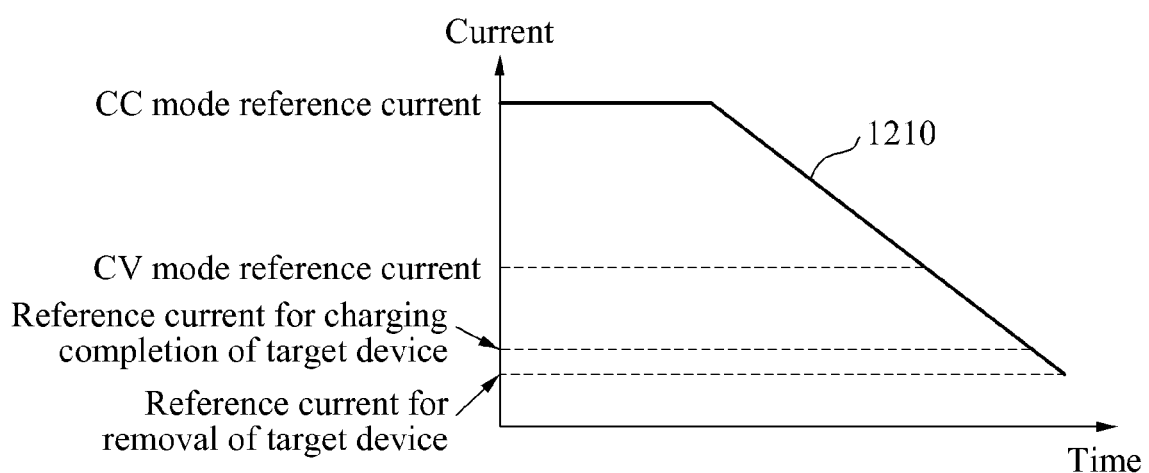
FIG. 12 is a diagram illustrating an example of a fluctuation in a charging current.

FIG. 12 illustrates an example of a fluctuation in a charging current. In a graph 1200, an x-axis represents time, and a y-axis represents a value of charging current. For example, FIG. 12 illustrates a value of charging current 1210 over time.

The load (e.g., 890 in FIG. 8) is charged in the CC mode for a predetermined period of time, for example, 50 minutes. Here, the charging current may be referred to as a "CC mode reference current." In other words, the CC mode reference current may indicate the value of the charging current 1210 when the load is charged in the CC mode. A charging voltage may be gradually increased to about 4.2 V.

Subsequently, the charging current 1210 may be gradually reduced to a range of 20 mA to 30 mA. When a charging mode of the target device (e.g., 520 in FIG. 5) is changed, the charging current 1210 may have a predetermined value. A point in time at which the charging current 1210 is reduced to the range of 20 mA to 30 mA may be determined as a charging termination point. The charging current 1210 may be reduced for a predetermined period of time, for example 3 hours, and the load may typically be charged with current of 0.5 C to 1.0 C.

A CV mode reference current may indicate a value of the charging current 1210 when a charging mode of the load is regarded to be changed from the CC mode to the CV mode. A reference current of charging completion of a target device may indicate a value of the charging current 1210 when charging of the target device is regarded to be completed. Additionally, a reference current for removal of a target device may indicate a value of the charging current 1210 when the target device is regarded to be removed from charging.

Figure 13:
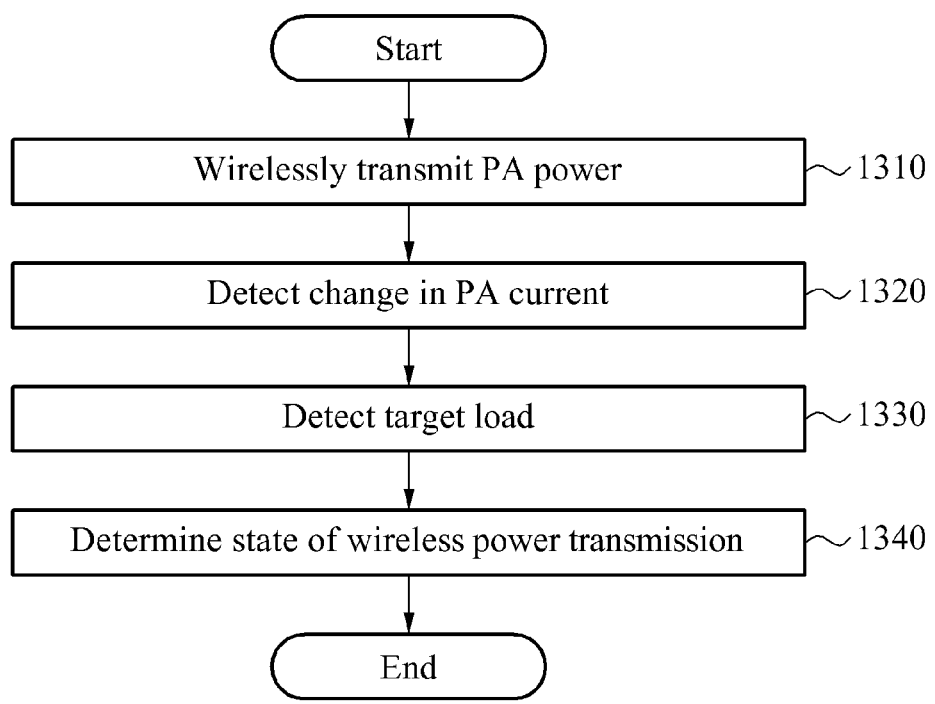
FIG. 13 is a flowchart illustrating an example of a method of detecting a load for wireless power transmission and of determining a state of the wireless power transmission.

FIG. 13 illustrates an example of a method of detecting a load for wireless power transmission and of determining a state of the wireless power transmission. At step 1310, the source device (e.g., 510 in FIG. 7) wirelessly transmits a PA power. For example, the control/communication unit (e.g., 710) determines the PA power. The control/communication unit controls the power supply (e.g., 720) to adjust a PA supply voltage. The power supply applies the PA supply voltage to the PA (e.g., 750) based on the control of the control/communication unit. The PA outputs the determined PA power. The source resonator (e.g., 760) wirelessly transmits, to the target device (e.g., 520 in FIG. 8), the PA power.

For example, a plurality of target devices (e.g., including the target device 520) may be provided. In this example, a target load may correspond to a sum of loads (e.g., 890 in FIG. 9) of the plurality of target devices.

At step 1320, the control/communication unit detects a change in a PA current by detecting the PA current. For example, the power detector (e.g., 730) detects a current of the PA power, namely, the PA current. The control/communication unit detects the change in the PA current, using the power detector. For example, when a charging mode of the target device is changed from a CC charging mode to a CV charging mode, the PA current may be changed.

At step 1330, the control/communication unit detects a target load based on the change in the PA current. At step 1340, the control/communication unit determines the state of wireless power transmission based on the detected target load. For example, when the detected PA current becomes lower than a predetermined value, the control/communication unit terminates charging of the target device. Additionally, the control/communication unit adjusts the PA power based on the detected target load.

Table 1 shows a relationship between the change in the PA current detected in step 1320, and the state of the wireless power transmission determined in step 1340.

TABLE 1

| Change in PA current | State of wireless power transmission |
| --- | --- |
| PA current is changed within a predetermined period of time. | A location of a target device may be changed, or a location of a charging pad may be changed, or external effects may occur. |
| PA current is generated for more than a predetermined period of time. | Charging of a target device may fail, or other problems may occur. |
| When a source device is in a single target device charging mode, or in the CC mode, the PA current is reduced. | A currently charged target device may be removed, or a target device may be changed from the CC mode to the CV mode. |
| When a source device is in a multi-target device charging mode, the PA current is reduced to a predetermined level. | A currently charged target device may be changed from the CC mode to the CV mode, or charging of the target device may be completed. |
| When a source device is in the multi-target device charging mode, the PA current is reduced to a current corresponding to a target load occurring when there is no target device. | Whether a target device exists may be determined via communication between a source device and a target device. |
| When a source device is in the single target device charging mode, or in the multi-target device charging mode, the PA current is increased. | A target device is added. |
| Abnormally high PA current (namely, an overcurrent) is detected. | An operation of protecting a source device is performed. |

Figure 14:
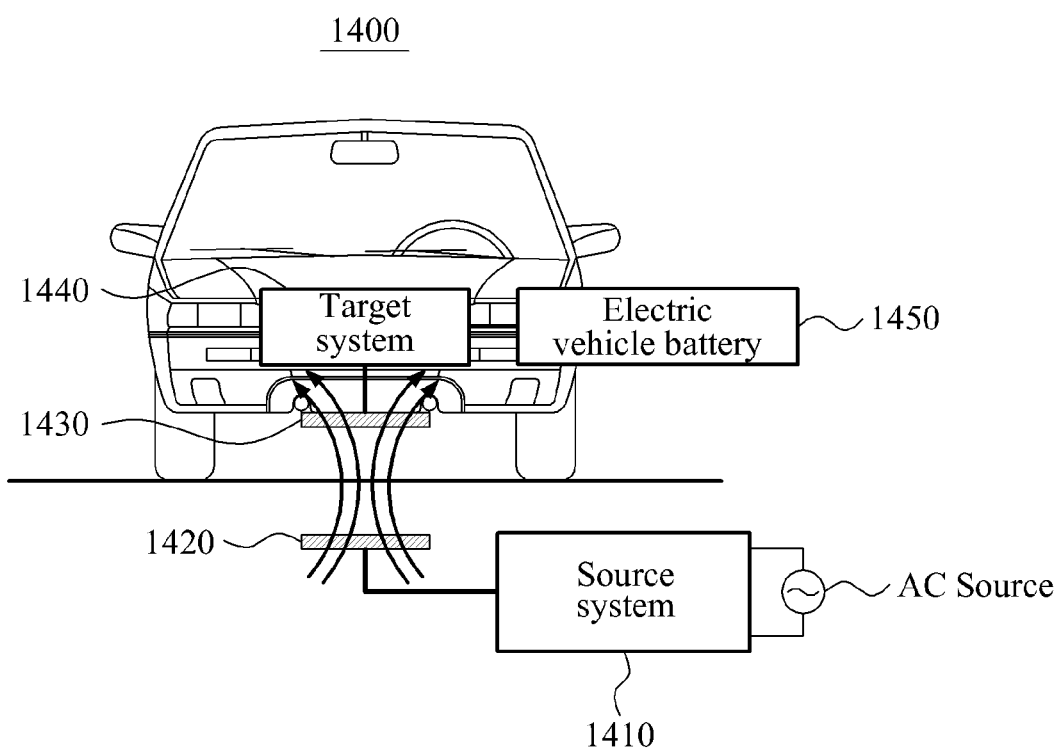
FIG. 14 is a diagram illustrating an electric vehicle charging system.

FIG. 14 illustrates an example of an electric vehicle charging system.

Referring to FIG. 14, an electric vehicle charging system 1400 includes a source system 1410, a source resonator 1420, a target resonator 1430, a target system 1440, and an electric vehicle battery 1450.

The electric vehicle charging system 1400 may have a similar structure to the wireless power transmission and charging system of FIG. 1. The source system 1410 and the source resonator 1420 in the electric vehicle charging system 1400 may function as a source. Additionally, the target resonator 1430 and the target system 1440 in the electric vehicle charging system 1400 may function as a target.

The source system 1410 may include an AC/DC converter, a power detector, a power converter, a control/communication unit, similarly to the source device 110 of FIG. 1. The target system 1440 may include a rectification unit, a DC/DC converter, a switch unit, a charging unit, and a control/communication unit, similarly to the target device 120 of FIG. 1.

The electric vehicle battery 1450 may be charged by the target system 1440.

The electric vehicle charging system 1400 may use a resonant frequency in a band of a few kilohertz (KHz) to tens of MHz.

The source system 1410 may generate power, based on a type of charging vehicle, a capacity of a battery, and a charging state of a battery, and may supply the generated power to the target system 1440.

The source system 1410 may control the source resonator 1420 and the target resonator 1430 to be aligned. For example, when the source resonator 1420 and the target resonator 1430 are not aligned, the control/communication unit of the source system 1410 may transmit a message to the target system 1440, and may control alignment between the source resonator 1420 and the target resonator 1430.

For example, when the target resonator 1430 is not located in a position enabling maximum magnetic resonance, the source resonator 1420 and the target resonator 1430 may not be aligned. When a vehicle does not stop accurately, the source system 1410 may induce a position of the vehicle to be adjusted, and may control the source resonator 1420 and the target resonator 1430 to be aligned.

The source system 1410 and the target system 1440 may transmit or receive an ID of a vehicle, or may exchange various messages, through communication.

The descriptions of FIGS. 2 through 22 may be applied to the electric vehicle charging system 1400. However, the electric vehicle charging system 1400 may use a resonant frequency in a band of a few KHz to tens of MHz, and may transmit power that is equal to or higher than tens of watts to charge the electric vehicle battery 1450.

Figure 15A:
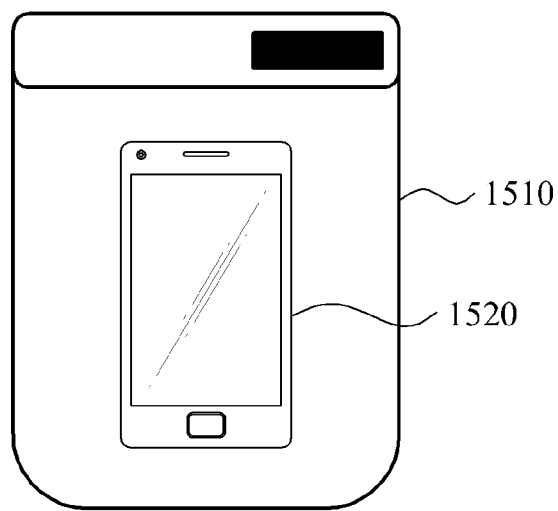
FIGS. 15A through 16B are diagrams illustrating examples of applications in which a wireless power receiver and a wireless power transmitter may be mounted.
Figure 15B:
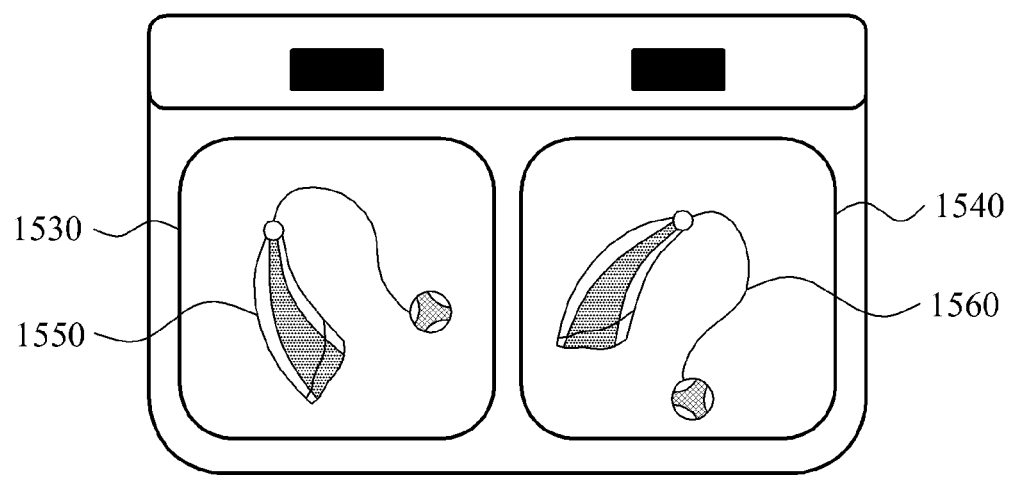

FIGS. 15A through 15B illustrate examples of applications in which a wireless power receiver and a wireless power transmitter may be mounted.

FIG. 15A illustrates an example of wireless power charging between a pad 1510 and a mobile terminal 1520, and FIG. 15B illustrates an example of wireless power charging between pads 1530 and 1540 and hearing aids 1550 and 1560.

In an example, a wireless power transmitter may be mounted in the pad 1510, and a wireless power receiver may be mounted in the mobile terminal 1520. The pad 1510 may be used to charge a single mobile terminal, namely the mobile terminal 1520.

In another example, two wireless power transmitters may be respectively mounted in the pads 1530 and 1540. The hearing aids 1550 and 1560 may be used for a left ear and a right ear, respectively. In this example, two wireless power receivers may be respectively mounted in the hearing aids 1550 and 1560.

Figure 16A:
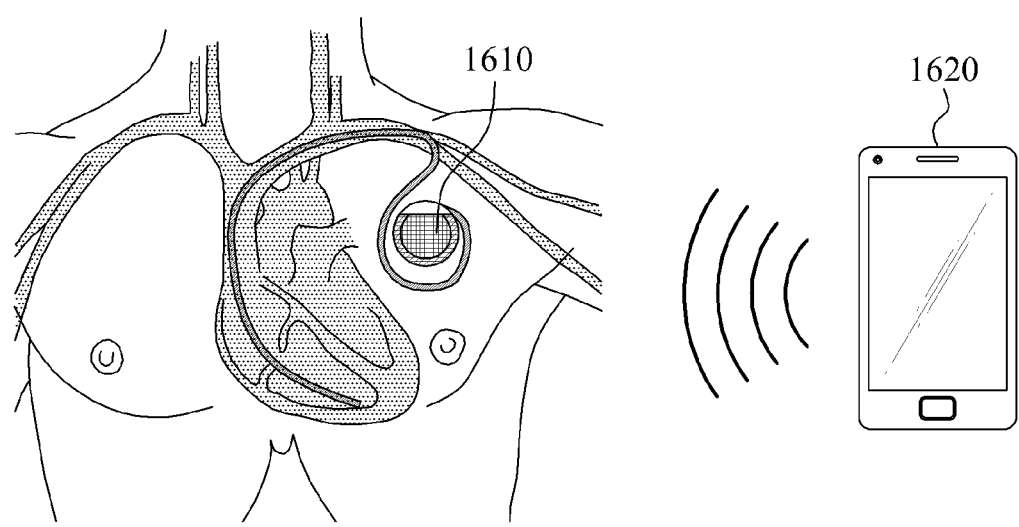
Figure 16B:
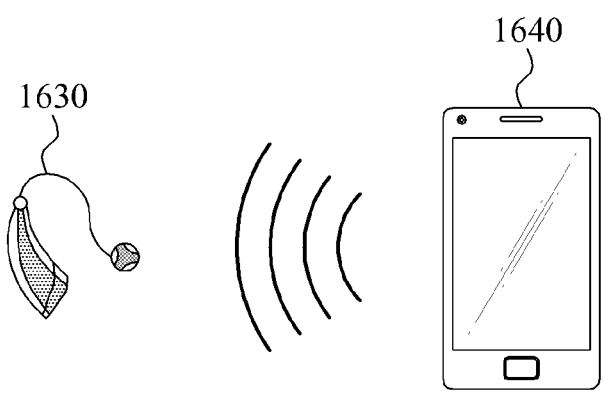

FIG. 16A illustrates an example of wireless power charging between an electronic device 1610 that is inserted into a human body, and a mobile terminal 1620. FIG. 16B illustrates an example of wireless power charging between a hearing aid 1630 and a mobile terminal 1640.

In an example, a wireless power transmitter and a wireless power receiver may be mounted in the mobile terminal 1620. In this example, another wireless power receiver may be mounted in the electronic device 1610. The electronic device 1610 may be charged by receiving power from the mobile terminal 1620.

In another example, a wireless power transmitter and a wireless power receiver may be mounted in the mobile terminal 1640. In this example, another wireless power receiver may be mounted in the hearing aid 1630. The hearing aid 1630 may be charged by receiving power from the mobile terminal 1640. Low-power electronic devices, for example Bluetooth earphones, may also be charged by receiving power from the mobile terminal 1640.

Figure 17:
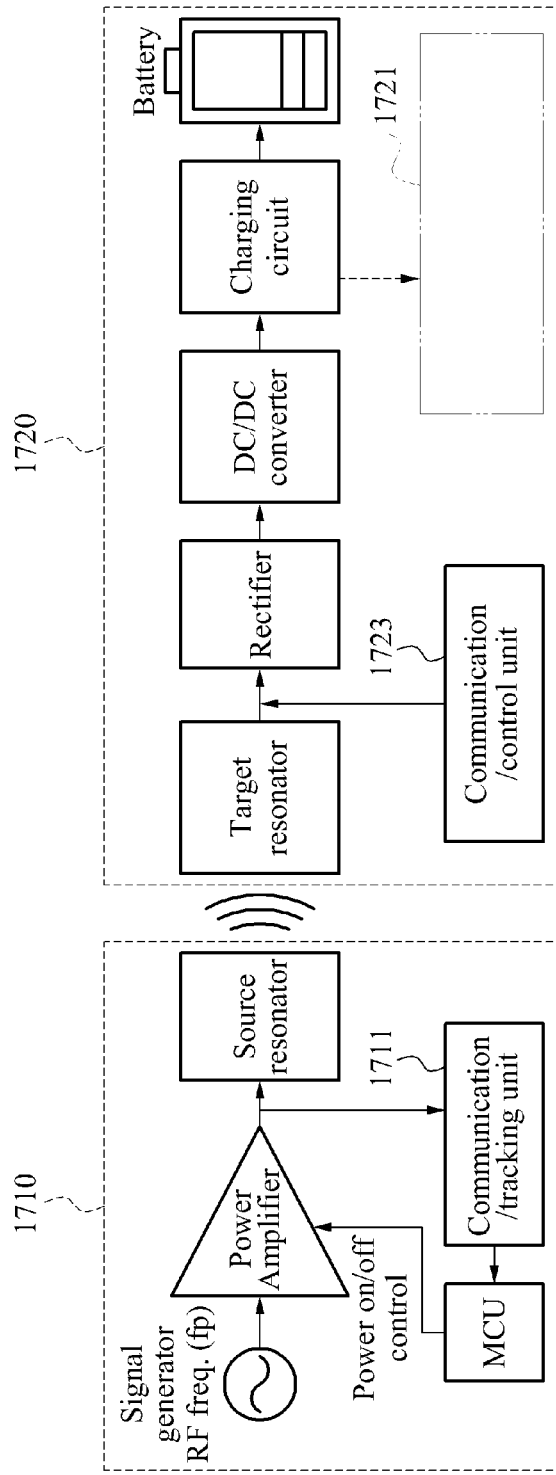
FIG. 17 is a diagram illustrating an example of a wireless power transmitter and a wireless power receiver.

FIG. 17 illustrates an example of a wireless power transmitter and a wireless power receiver.

In FIG. 17, a wireless power transmitter 1710 may be mounted in each of the pads 1530 and 1540 of FIG. 15B. Additionally, the wireless power transmitter 1710 may be mounted in the mobile terminal 1640 of FIG. 16B.

In addition, a wireless power receiver 1720 may be mounted in each of the hearing aids 1550 and 1560 of FIG. 15B.

The wireless power transmitter 1710 may have a similar configuration to the source device 110 of FIG. 1. For example, the wireless power transmitter 1710 may include a unit configured to transmit power using magnetic coupling.

As illustrated in FIG. 17, the wireless power transmitter 1710 includes a communication/tracking unit 1711. The communication/tracking unit 1711 may communicate with the wireless power receiver 1720, and may control an impedance and a resonant frequency to maintain a wireless power transmission efficiency. Additionally, the communication/tracking unit 1711 may perform similar functions to the power converter 114 and the control/communication unit 115 of FIG. 1.

The wireless power receiver 1720 may have a similar configuration to the target device 120 of FIG. 1. For example, the wireless power receiver 1720 may include a unit configured to wirelessly receive power and to charge a battery. As illustrated in FIG. 17, the wireless power receiver 1720 includes a target resonator, a rectifier, a DC/DC converter, and a charging circuit. Additionally, the wireless power receiver 1720 may include a control/communication unit 1723.

The communication/control unit 1723 may communicate with the wireless power transmitter 1710, and may perform an operation to protect overvoltage and overcurrent.

The wireless power receiver 1720 may include a hearing device circuit 1721. The hearing device circuit 1721 may be charged by the battery. The hearing device circuit 1721 may include a microphone, an analog-to-digital converter (ADC), a processor, a digital-to-analog converter (DAC), and a receiver. For example, the hearing device circuit 1721 may have the same configuration as a hearing aid.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
    a resonator configured to wirelessly transmit, to a target device, an output power;
    a power detector configured to detect a current of the output power; and
    a controller configured to
        detect a change in the current,
        detect a target load based on the change in the current,
        receive, from the target device, information on a received power, and
        determine a charging mode of the target device based on the information;
    wherein an operation mode of the wireless power transmitter is selected from a plurality of operation modes comprising a standby mode, a connection mode, and a charging control mode,
    wherein the charging mode is selected from a plurality of charging modes comprising a constant current (CC) mode and a constant voltage (CV) mode, and
    wherein the controller receives the information in the charging control mode, and adjusts the output power based on the charging mode.

2. The wireless power transmitter of claim 1, wherein the controller is further configured to determine the output power.

3. The wireless power transmitter of claim 1, further comprising:
    a power converter configured to output the output power.

4. The wireless power transmitter of claim 3, wherein the load is applied to an output of the power converter.

5. The wireless power transmitter of claim 3, further comprising:
    a power supply configured to apply, to the power converter, a voltage based on a control of the controller.

6. The wireless power transmitter of claim 1, wherein the controller is further configured to determine a state of a wireless power transmission based on the target load.

7. The wireless power transmitter of claim 1, wherein, when the current is less than a predetermined value, the controller is further configured to terminate a charging of the target device.

8. The wireless power transmitter of claim 1, wherein the controller is further configured to adjust the output power based on the target load.

9. The wireless power transmitter of claim 1, wherein the target load comprises a sum of loads of target devices.

10. The wireless power transmitter of claim 1, wherein the power detector comprises:
    a first resistor in which the current flows; and
    a comparator configured to output, to the controller, voltages applied to a first terminal and a second terminal of the first resistor,
    wherein the controller is further configured to detect the target load based on the voltages and a resistance value of the first resistor.

11. The wireless power transmitter of claim 10, further comprising:
    a power converter configured to output the output power,
    wherein the power detector further comprises
    a second resistor comprising a first terminal and a second terminal, the first terminal being connected to the first terminal of the first resistor, and the second terminal being connected to a positive terminal of the comparator, and
    a third resistor comprising a first terminal and a second terminal, the first terminal being connected to the second terminal of the first resistor and an input of the power converter, and the second terminal being connected to a negative terminal of the comparator.

12. A method of detecting a load in a wireless power transmission, comprising:
    wirelessly transmitting, to a target device, an output power;
    detecting a current of the output power;
    detecting a change in the current;
    detecting a target load based on the change in the current;
    receiving, from the target device, information on a received power;
    determining a charging mode of the target device based on the information; and
    wherein an operation mode of the wireless power transmitter is selected from a plurality of operation modes comprising a standby mode, a connection mode, and a charging control mode,
    wherein the charging mode is selected from a plurality of charging modes comprising a constant current (CC) mode and a constant voltage (CV) mode, and
    wherein the controller receives the information in the charging control mode, and adjusts the output power based on the charging mode.

13. The method of claim 12, further comprising:
    determining a state of the wireless power transmission based on the target load.

14. The method of claim 12, further comprising, when the current is less than a predetermined value, terminating a charging of the target device.

15. The method of claim 12, further comprising adjusting the output power based on the target load.

16. The method of claim 12, wherein the target load further comprises a sum of loads of target devices.

17. The method of claim 12, further comprising:
    matching an impedance and a resonant frequency of a source device to an impedance and a resonant frequency of the target device.

18. A non-transitory computer-readable storage medium storing a program comprising instructions to cause a computer to implement the method of claim 12.

* * * * *